(12) United States Patent
Mozelack et al.

(10) Patent No.: US 6,342,283 B1
(45) Date of Patent: Jan. 29, 2002

(54) MELT-BLOWN TUBULAR CORE ELEMENTS AND FILTER CARTRIDGES INCLUDING THE SAME

(75) Inventors: Brian Mozelack, White Hall, MD (US); Robert J. Schmitt, Stewartstown, PA (US); Steven D. Barboza, Bel Air, MD (US); Praveen Jana, Timonium, MD (US); Son Ngoc Nguyen, Owings Mills, MD (US); Ronald R. Gschwandtner, Mt. Airy, MD (US); Robert D. Connor, Spring Grove, PA (US); Timothy W. Yingling, Manchester, MD (US)

(73) Assignee: USF Filtration & Separations, Inc., Timonium, MD (US)

( * ) Notice: Subject to any disclaimer, the term of this patent is extended or adjusted under 35 U.S.C. 154(b) by 0 days.

(21) Appl. No.: 09/358,886

(22) Filed: Jul. 22, 1999

Related U.S. Application Data

(63) Continuation-in-part of application No. 09/281,320, filed on Mar. 30, 1999, now abandoned.

(51) Int. Cl.$^7$ .............................................. B01D 29/13
(52) U.S. Cl. .................. 428/36.9; 210/457; 210/497.1; 210/497.01; 210/496
(58) Field of Search ................................ 428/36.9, 373, 428/374, 110, 357, 113, 114; 210/323.2, 503, 505, 488, 489, 457, 496, 497.01, 497.1, 510.1

(56) References Cited

U.S. PATENT DOCUMENTS

| | | | |
|---|---|---|---|
| 3,933,557 A | 1/1976 | Pall | 156/167 |
| 4,048,364 A | * 9/1977 | Harding et al. | 428/113 |
| 4,112,159 A | 9/1978 | Pall | 428/36 |
| 4,116,738 A | 9/1978 | Pall | |
| 4,197,156 A | 4/1980 | Nakajima et al. | 156/446 |
| 4,975,018 A | 12/1990 | Langenbacher et al. | 414/751 |
| 5,340,479 A | 8/1994 | Szczepanski et al. | |
| 5,366,576 A | 11/1994 | Clack | 156/173 |
| 5,409,642 A | 4/1995 | Allen et al. | 264/6 |
| 5,591,335 A | 1/1997 | Barboza et al. | 210/323.2 |
| 5,653,833 A | 8/1997 | Mozelack et al. | 156/73.5 |
| 5,772,952 A | 6/1998 | Allen et al. | 264/555 |
| 6,054,216 A | 4/2000 | Allen et al. | 428/373 |

FOREIGN PATENT DOCUMENTS

| | | |
|---|---|---|
| EP | 0 447 875 A3 | 9/1991 |
| EP | 0 447 875 A2 | 9/1991 |

* cited by examiner

Primary Examiner—Harold Pyon
Assistant Examiner—Sow-Fun Hon
(74) Attorney, Agent, or Firm—Nixon & Vanderhye P.C.

(57) ABSTRACT

Filter cartridges may have a core element formed of a non-filtering, self-supporting non-woven mass of indefinite length continuous synthetic polymeric core fibers, and at least one annular filtration zone layer formed of a mass of non-woven indefinite length continuous synthetic polymeric filtration fibers. The non-woven core element is most preferably formed in situ during filter cartridge manufacturing by melt-blowing synthetic polymeric core fiber streams toward a forming mandrel. The non-woven core element is completely solidified prior to the filtration zone fibers being melt-blown thereon so that the core and filtration fibers are predominantly mechanically interlocked with one another, instead of being melt-bonded thereto. Filter cartridges of predetermined length may be cut from an upstream filter cartridge preform of indefinite length by subjecting the preform to forced cooling air to thereby minimize (if not eliminate entirely) significant filter cartridge shrinkage over time. In addition, a cutter assembly may be mounted laterally of the preform, but is capable of rate-synchronized longitudinal movement with the preform during its cutting operation.

19 Claims, 20 Drawing Sheets

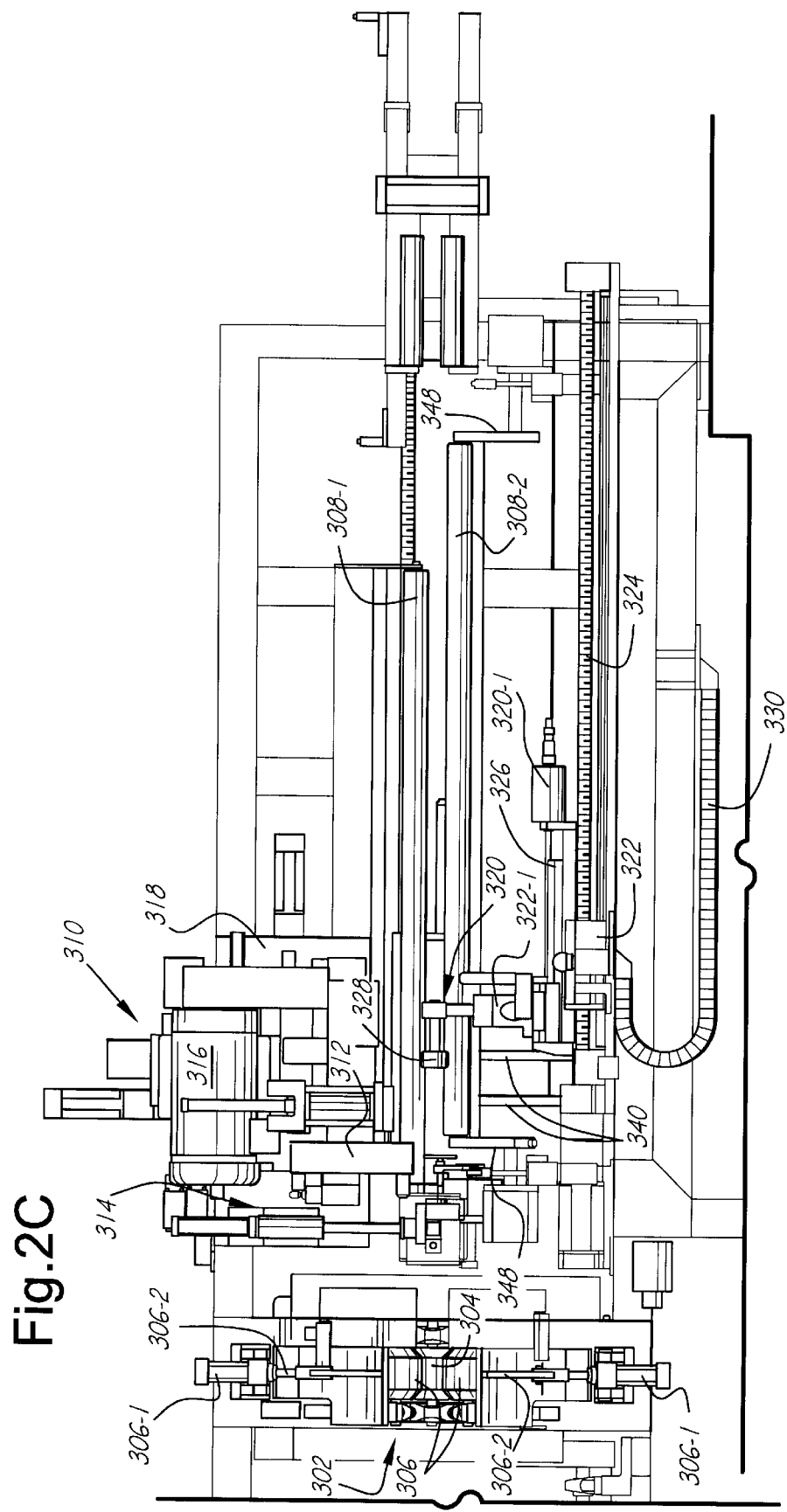

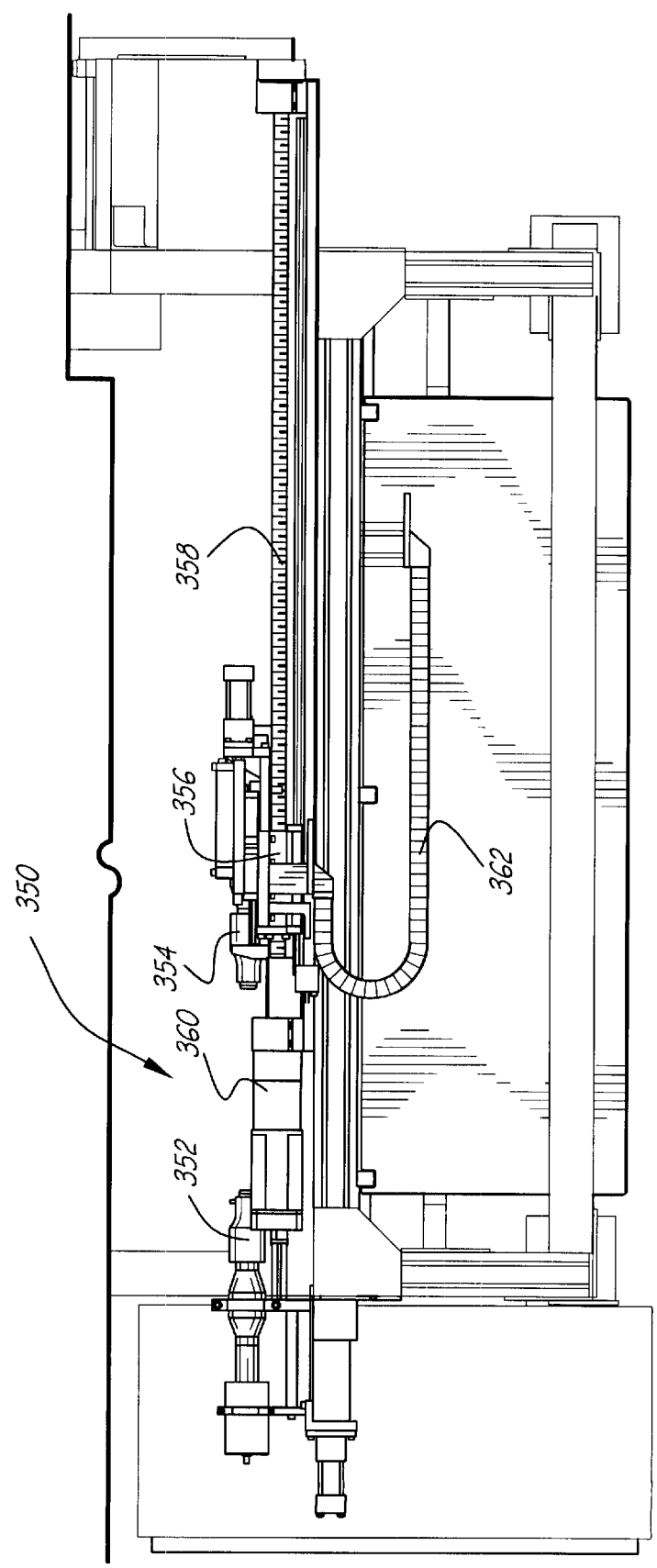

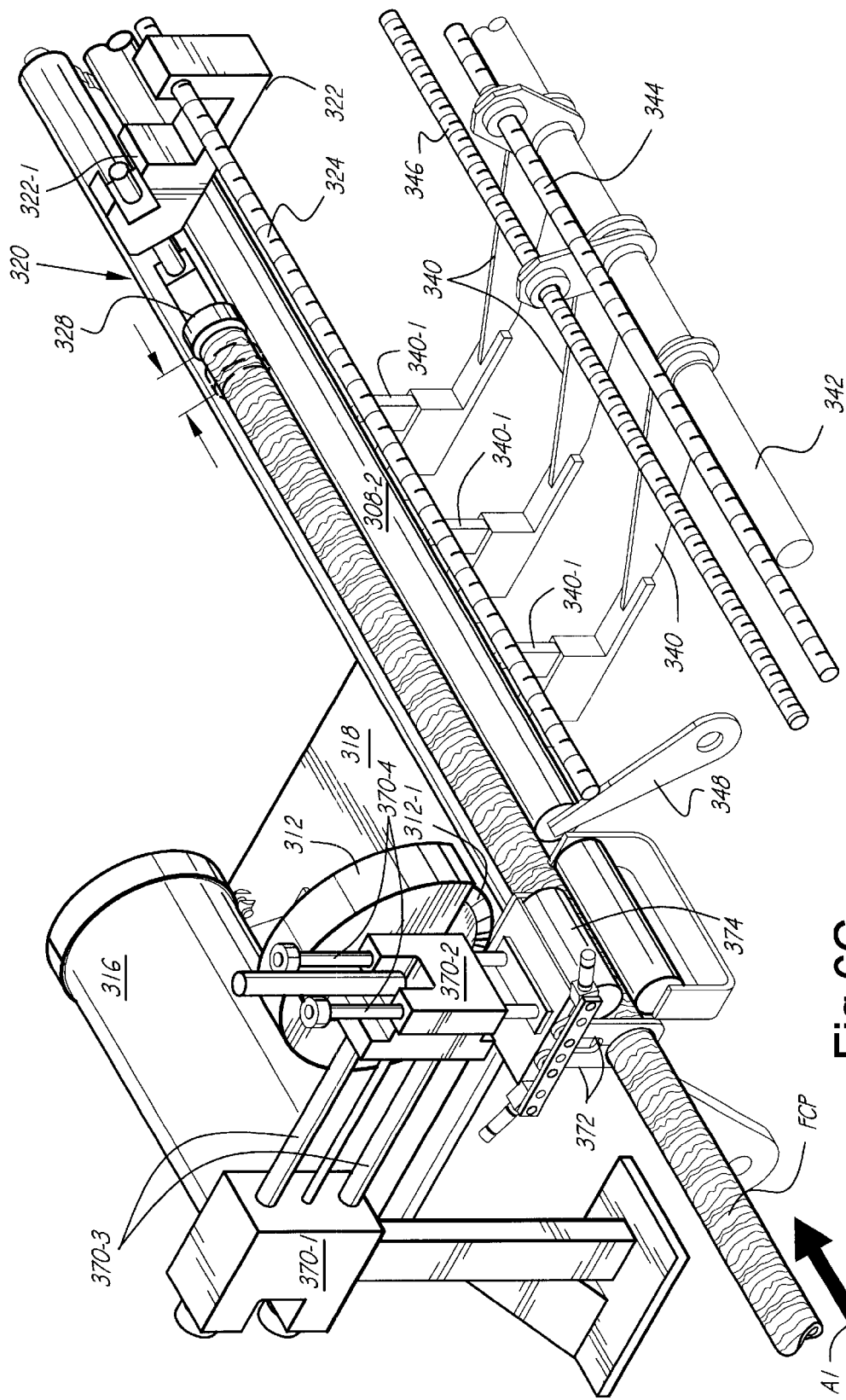

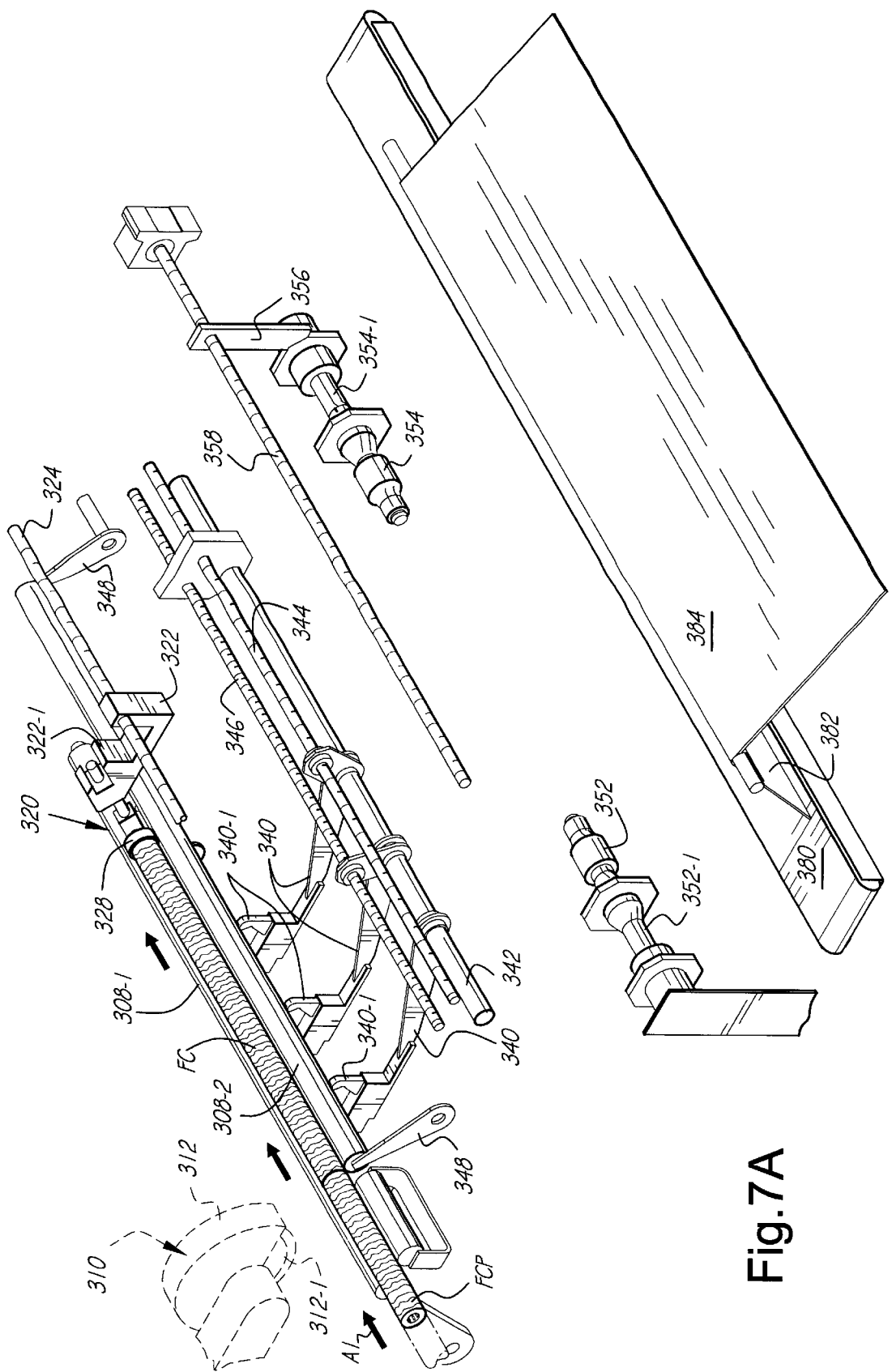

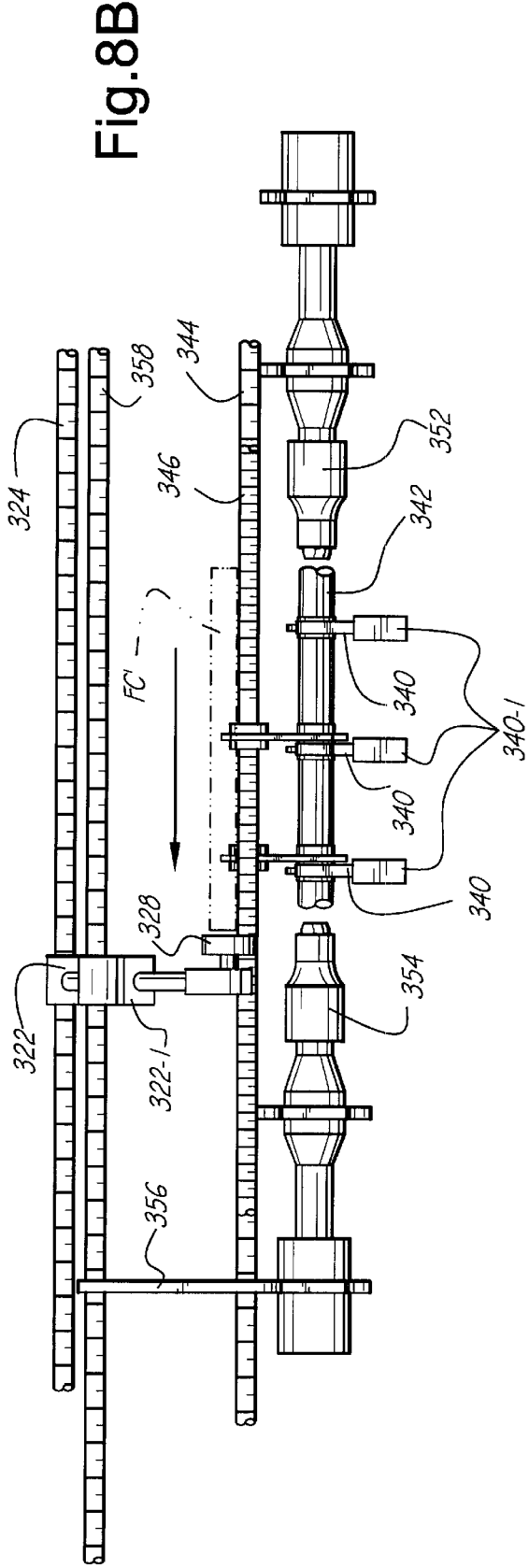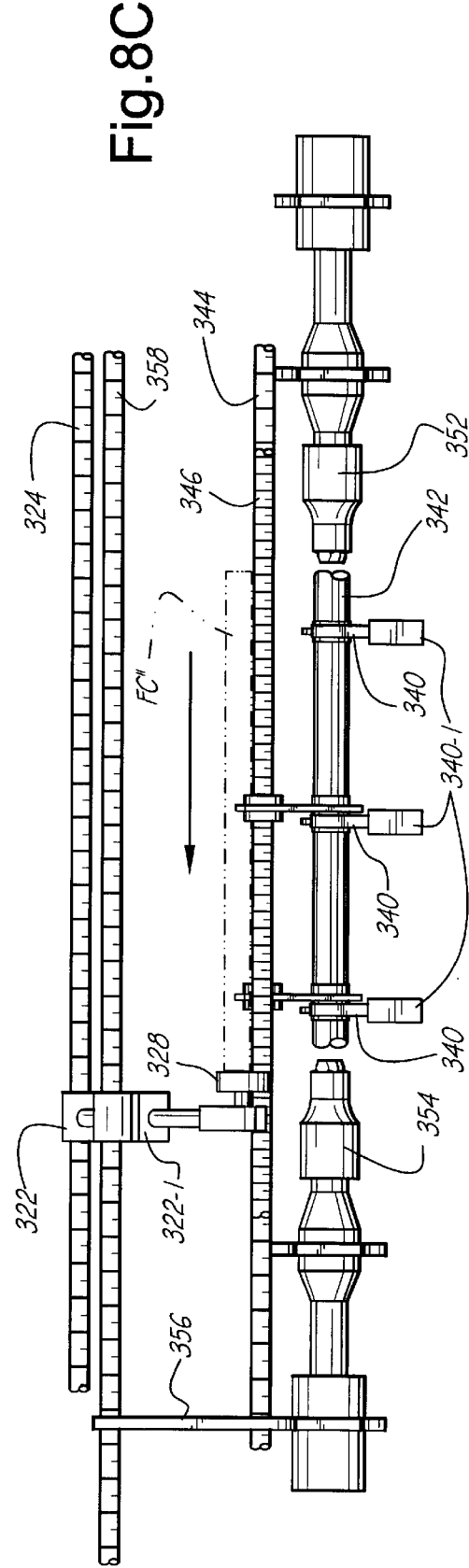

MELT-BLOWN TUBULAR CORE ELEMENTS AND FILTER CARTRIDGES INCLUDING THE SAME

CROSS-REFERENCE TO RELATED APPLICATION

This application is a continuation-in-part of U.S. patent application Ser. No. 09/281,320 filed on Mar. 30, 1999, abandoned, the entire content of which is expressly incorporated hereinto by reference.

FIELD OF THE INVENTION

The present invention relates generally to the field of fluid filtration. More specifically, the present invention relates to cylindrical disposable filter cartridges and methods and apparatus for making the same, whereby the filter cartridge includes a core element and a non-woven, melt-blown filter medium surrounding the core element.

BACKGROUND OF THE INVENTION

Filter cartridges formed of a nonwoven mass of melt blown, indefinite (continuous) length polymeric fibers are well known and have achieved widespread use in fluid filtration applications. Typically, such melt blown filter cartridges are made by extruding a polymer through orifices associated with a melt blowing die to form continuous length fibers which are directed toward an axially elongate rotating mandrel. During melt blowing, a flow of inert gas (e.g., air) acts on the molten fibers so as to attenuate the fibers to relatively fine diameter and to randomly distribute the attenuated fibers onto the mandrel. Over time, therefore, an annular mass of nonwoven, randomly intermingled solidified fibers builds up on the mandrel. Controlled axial movement of the built-up mass of melt blown fibers relative to the melt blowing die will therefore allow a cylindrical filter cartridge of indefinite length to be formed continuously.

Such melt-blown filter cartridges have been proposed in the past to be produced continuously with and without a separate core element. For example, coreless melt-blown filter cartridges are known in the art through U.S. Pat. No. 5,340,479 to Szczepanski et al (hereinafter "the Szczepanski et al '479 patent). According to the Szczepanski et al '479 patent, coreless melt-blown filter cartridges are formed by directing streams of polymeric fibers toward a rotating mandrel which serves to support the melt-blown polymeric filaments during the production process. The resulting tubular filter portion is subsequently axially withdrawn from the mandrel and will include a central support zone of non-woven polymer filaments and a filtration zone of non-woven polymeric filaments surrounding the central support zone.

Tubular filter cartridges having separate central core elements are also known. In this regard, the attenuated streams of polymeric fibers are typically melt-blown onto a rotating and axially translating core element where the fibers are allowed to build up into a non-woven fibrous mass. The core element thus forms an integral central support structure for the non-woven fibrous mass during both the production process and later during filtration when the filter cartridge is placed into service. The formation of such filter cartridges with integral core elements is, however, somewhat problematic on a continuous production basis.

Several proposals exist in the art for producing filter cartridges having integral separate core elements on a continuous production basis. For example, U.S. Pat. Nos. 4,112, 159 and 4,116,738 to Pall (hereinafter "the Pall '159 and '738 patents", the entire content of each being expressly incorporated hereinto by reference) disclose the temporary end-to-end joining of sequential preformed core elements by means of coaxially interdigitated spacers so that the joined preformed core elements are capable of being rotated and axially traversed as a unit relative to a melt-blowing die during the continuous production of melt-blown filter cartridges. The melt-blown fiber layer is subsequently cut at about the midpoint of the spacers leaving a lap which extends beyond the core elements at each end, thereby making it possible to pull off a filter length by withdrawing the core portion of the next following spacer. Presumably, the spacers removed from the filter lengths are then reused in the process disclosed in the Pall '159 and '738 patents.

As an alternative to using preformed core elements, the Pall '159 and '738 patents also disclose that the core element can be formed in situ by means of a continuous rotatable tubular extrusion die. The core element is thus extruded continuously in tubular form with an open central passage, in a continuous length. Prior to receiving the melt-blown fibers, the extruded core element is perforated or slit by cutting means to provide a plurality of apertures for passage of fluid therethrough into the central open passage of the core.

The techniques disclosed in the Pall '159 and '738 patents are not without disadvantages. For example, when using spacers as the means to couple preformed core elements in an end-to-end manner, care must be exercised that the melt-blown fiber media is cut at about the spacer's midpoint, thereby limiting the maximum length of the filter cartridge to the length of the preformed core element. Furthermore, the cut cannot be made entirely through the melt-blown fiber media and the spacer, since to do otherwise would result in sacrifice of the spacer thereby adding to the overall production costs of the filter cartridge. On the other hand, the continuous extrusion of the core element necessarily involves the provision of a rotatable extrusion die and core-perforation equipment which may not be cost effective in terms of already preformed core elements.

More recently, a technique for producing continuously melt-blown filter cartridges having preformed core elements has been disclosed through U.S. Pat. No. 5,653,833 to Mozelack et al (hereinafter "the Mozelack et al '833 patent", the entire content of which is expressly incorporated hereinto by reference). According to the Mozelack et al '833 patent, preformed thermoplastic elements are friction-welded coaxially in an end-to-end manner so that the core elements are joined integrally one to another. The integrally coaxially joined preformed core element can thus be rotated and traversed as a unit relative to the melt-blowing die(s) during the continuous production of indefinite length cylindrical melt-blown filter cartridges. Following melt-blowing of the polymeric fibers onto the joined core elements, the filter cartridge preforms may be cut to desired lengths (preferably on-line).

SUMMARY OF THE INVENTION

Broadly, the present invention relates to filter cartridges having a core element formed of a non-filtering, self-supporting non-woven mass of indefinite length continuous synthetic polymeric fibers, and at least one annular filtration zone layer formed of a mass of non-woven indefinite length continuous synthetic polymeric fibers, and to the apparatus and methods for making such filter cartridges.

Most preferably, the non-woven core element is formed in situ during filter cartridge manufacturing by melt-blowing synthetic polymeric fiber streams toward a forming mandrel. The fibers forming the core element are of sufficient diameter and/or density to define a highly open cross-sectional non-woven matrix structure which does not serve a filtration function under normal filtration conditions, but yet impart sufficient axial and radial rigidity to the core element sufficient to support the filtration zone fibers during manufacture and during filtration. That is, once formed, the core element provides a formation mandrel onto which the subsequently melt-blown filtration zone fibers may be accumulated.

Importantly, the non-woven fibrous mass of the core element must be completely solidified prior to the filtration zone fibers being melt-blown thereon. That is, according to the present invention, the filtration zone fibers are predominantly mechanically interlocked with the fibrous mass forming the core element, instead of being melt-bonded thereto. In such a manner, the relatively open pore structure of the core element can be maintained in the finished filter cartridge product (i.e., so it does not perform a filtration function).

Filter cartridges of predetermined length may be cut from an upstream filter cartridge perform of indefinite length having a melt-blown annular layer of non-woven melt-blown filtration zone fibers surrounding a melt-blown fibrous core element. According to the present invention, filter cartridges of very precise length can be achieved by subjecting the preform to forced cooling air to thereby minimize (if not eliminate entirely) significant filter cartridge shrinkage over time. In addition, a cutter assembly is mounted laterally of the preform, but is capable of rate-synchronized longitudinal movement with the preform during the cutting operation. In this manner, very precise cuts may be made through the preform which do not necessarily require downstream trimming in order to achieve precise nominal filter cartridge lengths.

These and other aspects and advantages of the present invention will become more clear from the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein, FIG. 1 is a schematic plan layout view of an exemplary preferred apparatus in accordance with the present invention;

FIG. 2C is a somewhat enlarged plan view of the filter cartridge cutting/transfer subassembly in accordance with the present invention;

FIG. 2D is a somewhat enlarged plan view of the end-finishing subassembly in accordance with the present invention;

FIGS. 6A–6D are perspective views of the operational sequence used by the cutting subassembly to sever the filter cartridge preform into predetermined filter cartridge lengths;

FIG. 7A–7D are perspective views of an operational sequence used by the transfer and end-finishing subassemblies in accordance with the present invention;

FIGS. 8A–8C are longitudinal side elevation view of the transfer and end-finishing subassemblies in accordance with the present invention showing the proportional movements of the principal structural components thereof to accommodate filter cartridges of different finished lengths;

Figure 9:
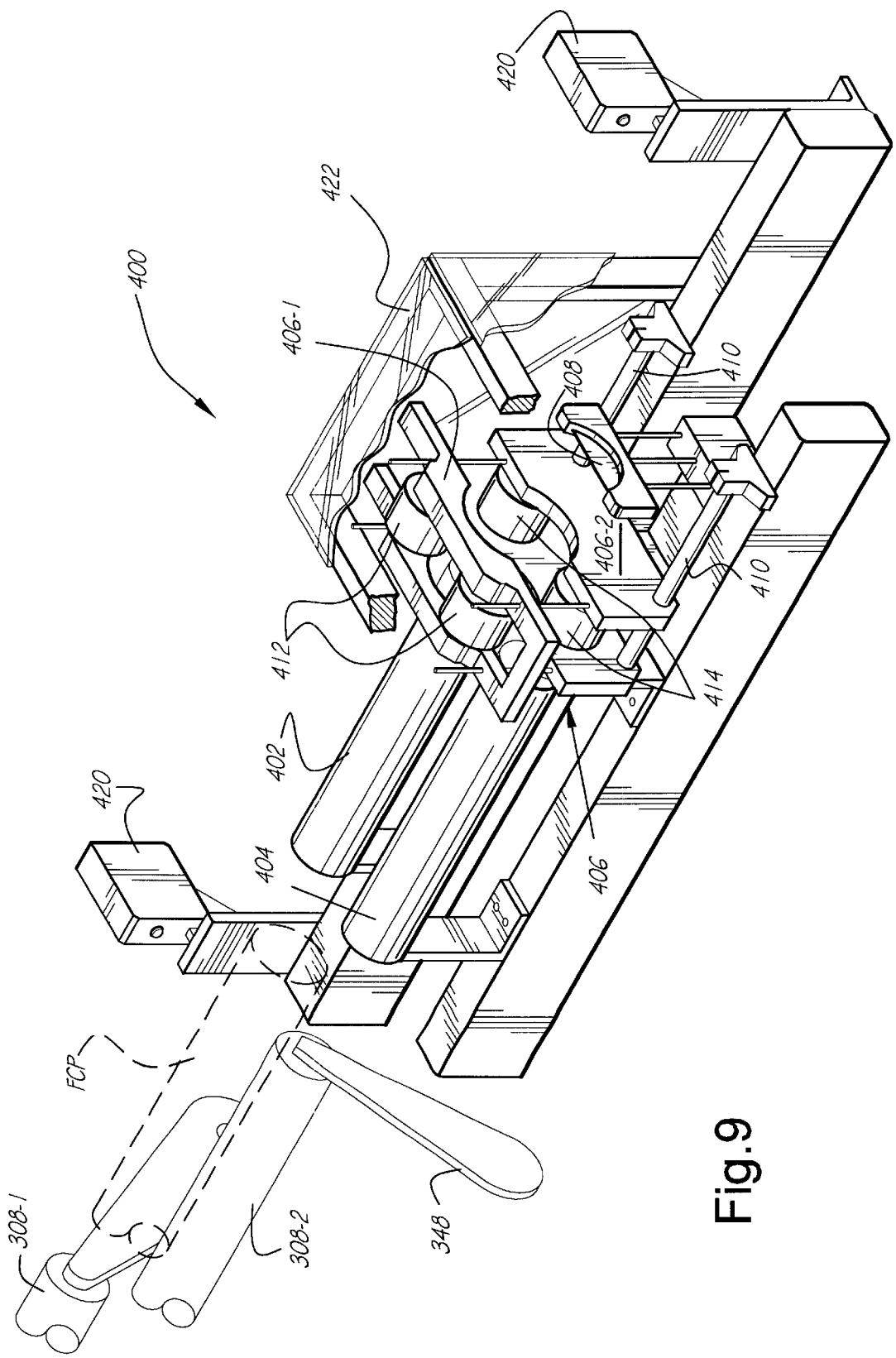
Figure 10A:
Figure 10B:
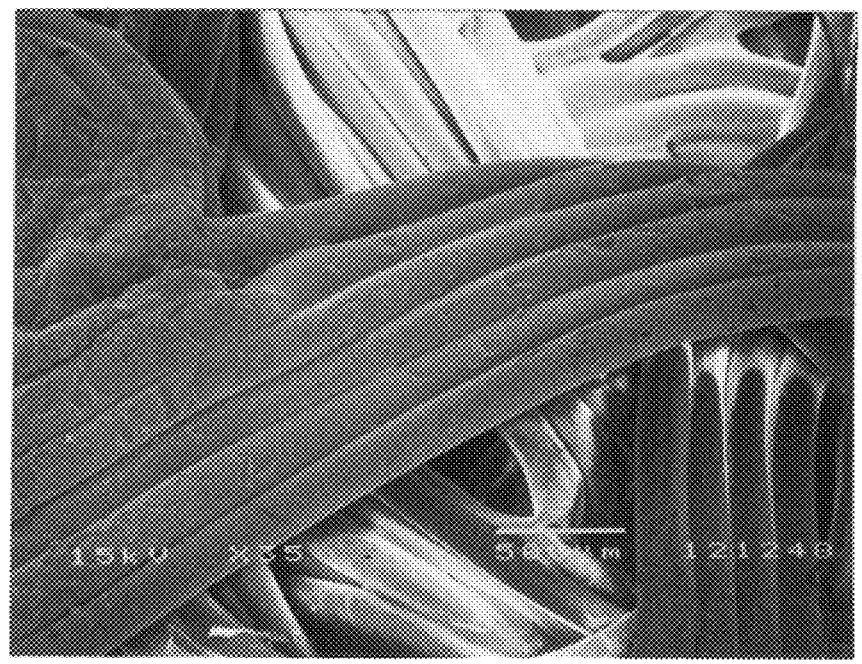

FIG. 9 is a perspective view, looking upstream, of a secondary cutting sub-assembly that allows the upstream production systems to remain operative during times when the primary cutting system is inoperative (e.g., to allow saw blades to be changed on the primary cutting sub-assembly); and FIGS. 10A and 10B are photomicrographs taken at 20× and 35× magnification, respectively, of an exemplary melt-blown core element of the present invention which was made in accordance with the Example below.

DETAILED DESCRIPTION OF THE INVENTION

Figure 1:
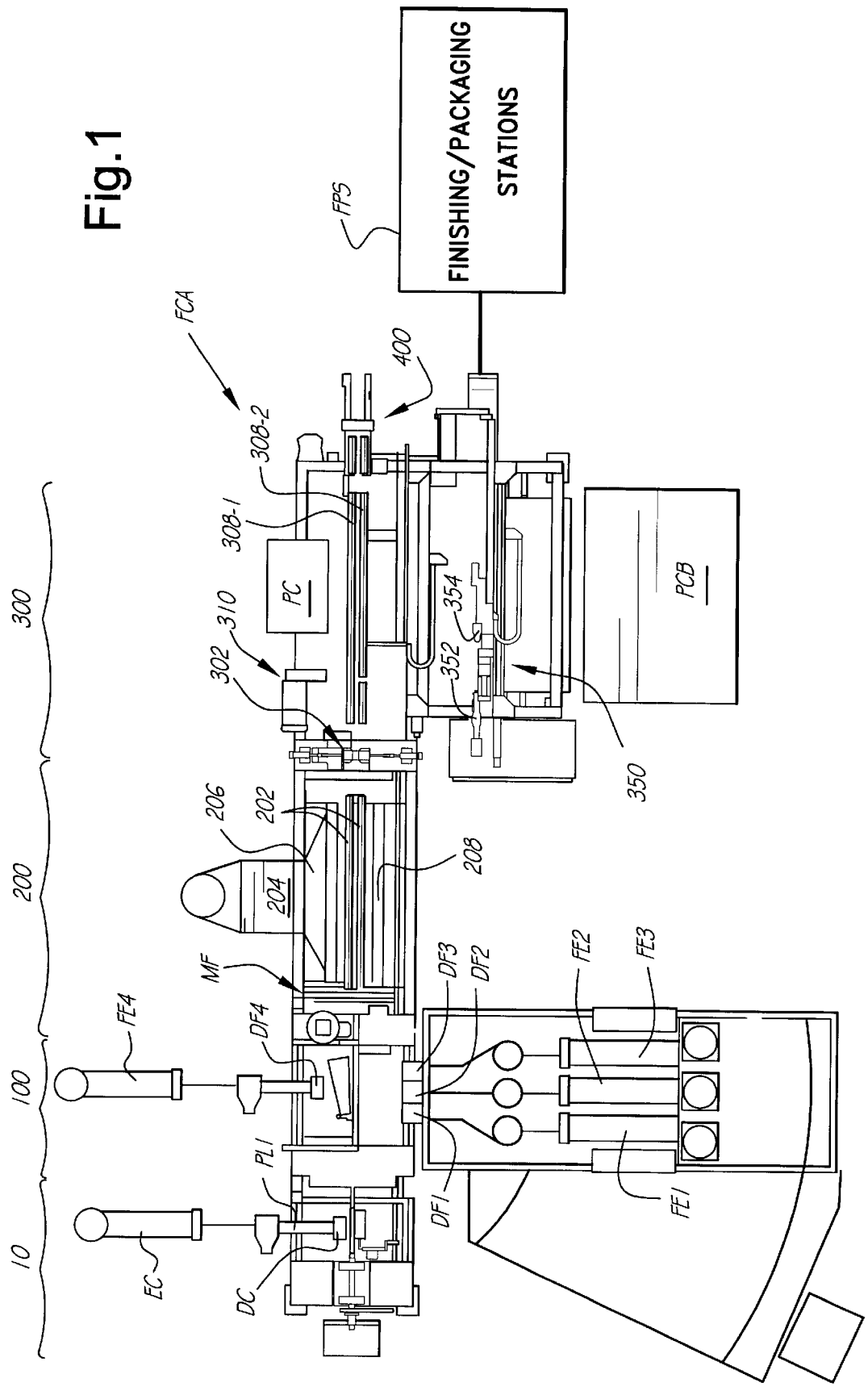

Accompanying FIG. 1 represents a plan view of preferred equipment that may be employed in the filter cartridge production apparatus FCA of the present invention. In this regard, the apparatus FCA is generally comprised of a core element production sub-system 10, a filtration fiber production sub-system 100, a preform cooling sub-system 200 and a cutting and transfer sub-system 300. In general, the core element sub-system 10 serves to melt-blow a mass of non-woven fibers to form a cylindrical core element. The non-woven core element is then continuously longitudinally traversed past the filter fiber production subsystem 100 where filtration fibers are melt-blown onto the continuously rotating and longitudinally translating core element to form a sufficient radial thickness of non-woven melt-blown filtration fibers as an annular filtration zone thereon. The filter cartridge preform is then continuously traversed through the cooling sub-system 200 where chilled air is directed onto the preform to ensure that all of the fibers forming the same are solidified and cooled to significantly minimize (if not prevent entirely) later shrinkage. The cooled filter cartridge preform is then cut precisely into predetermined lengths in the cutting and transfer sub-system 300. Individual ones of the filter cartridges cut to predetermined lengths may then be transferred by the sub-system 300 to either a product collection bin PCB or to downstream finishing/packaging stations FPS as may be desired.

Figure 2A:
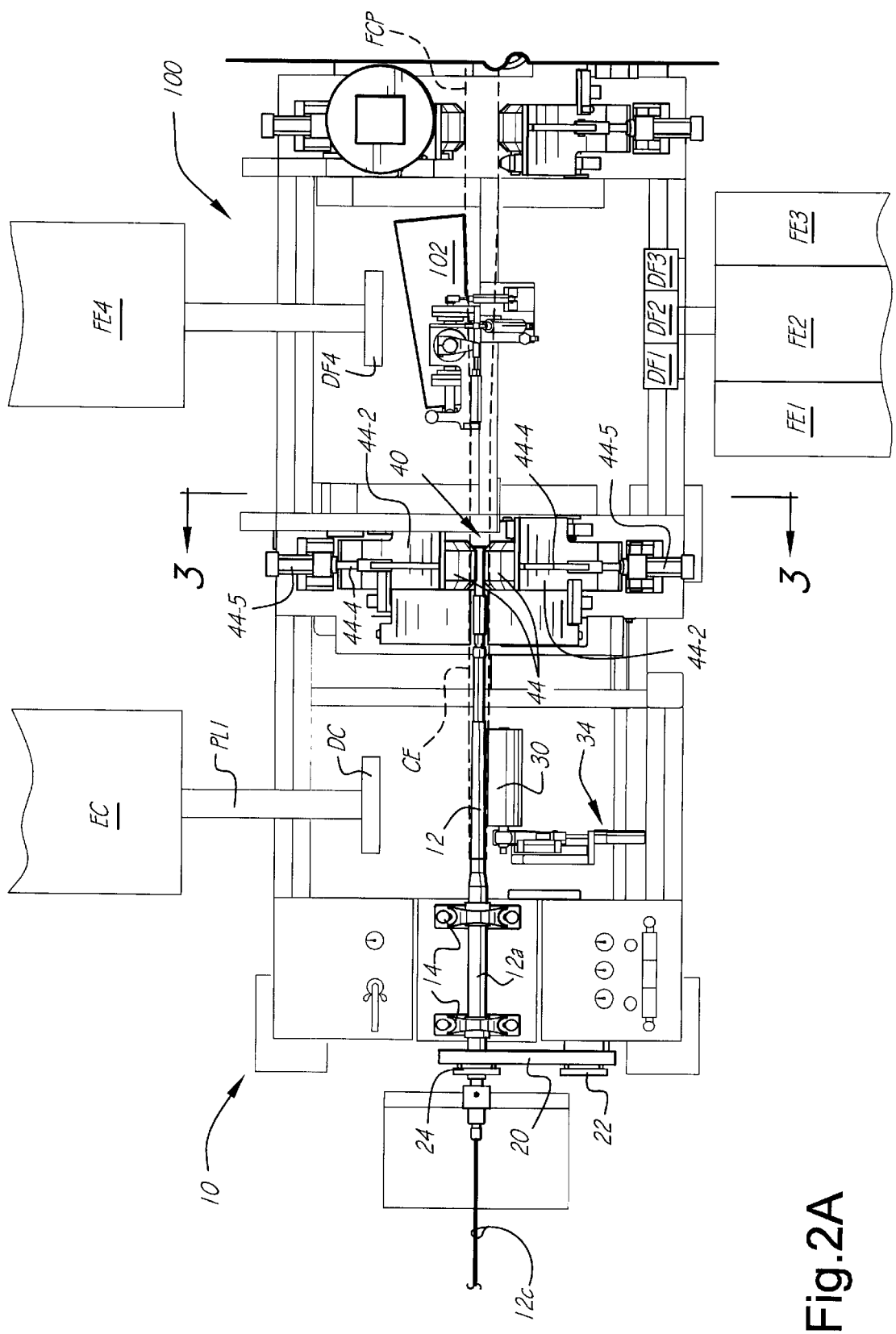
FIG. 2A is a somewhat enlarged plan view of the melt-blowing subassembly in accordance with the present invention that is employed to form the central core element and the annular zone of non-woven filtration fibers thereon.

Accompanying FIG. 2A depicts in somewhat greater detail the core element production sub-system 10 and filtration fiber production sub-system 100. With regard to the core element production sub-system 10, it can be seen that a longitudinally oriented (i.e., relative to the longitudinal axis of the filter cartridge preform FCP and its axial direction of movement during production) mandrel 12 is mounted to the machine frame MF in a cantilever fashion at its near end 12a by means of bearing blocks 14. The mandrel 12 is rotated in a selected rotation direction by drive belt 20 which couples the output sprocket 22 of a motor (not shown) to the drive sprocket 24 rigidly carried by the end 12a of mandrel 12.

Figure 4:
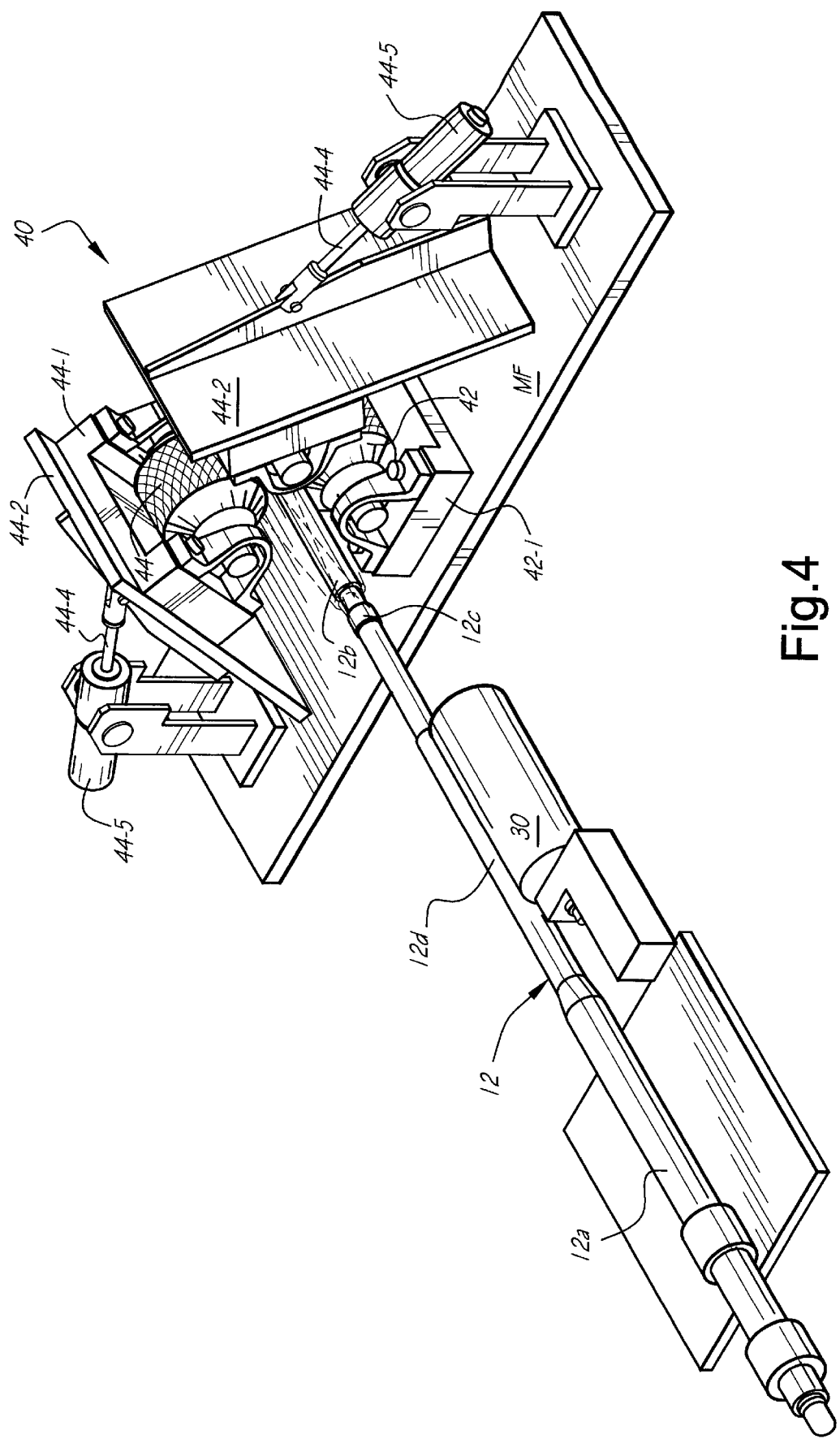
FIG. 4 is a perspective view of the core-forming mandrel and core drive systems.

Thermoplastic pellets are rendered molten by the core filament extruder EC and transferred to the core filament die assembly DC via polymer line PL1. As is well known, the molten polymer from the extruder EC is extruded through appropriately sized orifices associated with the melt-blowing die DC to form fibers which are directed toward the rotating forming mandrel 12 with the aid of air flow. The fibers issued from the die DC are thus collected on the mandrel 12 and are pressed by means of a press roller 30 to form the core element (noted in phantom line in FIG. 2A by reference CE, but see also FIGS. 4 and 5).

The press roller 30 may be moved toward and away from the collected fibers by means of a pneumatic cylinder assembly 34 so as to impart the desired pressure to the core element fibers during formation. Furthermore, the press roller 30 is preferably somewhat tapered in the upstream direction (i.e., slightly conically shaped) and angled relative to the axis of the spindle 12 so as to accommodate the thickness dimension of the core element CE as it is "built" by the accumulation of fiber streams issued from the die DC. The angled orientation of the roller 30 will thus form an upstream gap between an upstream end of the roller 30 and the immediately opposed surface of the mandrel 12 which is of a lesser dimension as compared to the downstream gap between a downstream end of the roller 30 and a corresponding opposed surface portion of the mandrel 12.

As shown in FIG. 2A, the die DC is most preferably misregistered (i.e., is not in direct opposition) relative to the press roller 30. As a result of this misregistration, an upstream portion of the fiber streams issued from the die DC will initially accumulate freely on the mandrel 12 without contact with the roller 30. Subsequently, this initial accumulation of some upstream fibers issued from die DC is then forced through the upstream nip space between the upstream end of the roller 30 and the mandrel 12 (i.e., due to the downstream axial translation of the core element CE during formation). These initial upstream fibers are thus compressed to a degree which forms a relatively smooth interior surface of the core element CE when completed. The formation of this interior smoothness is further assisted by providing the mandrel 12 with perforations in that area where fibers are collected from the die DC. A flow of positive pressure air is supplied into the hollow of the mandrel 12 by line 12c and thus exits through the perforations in that area where the core element fibers are being collected on mandrel 12 As a result, the pressurized air will assist in cooling and solidification of the fibers issued by die DC and collected on mandrel 12 which, in turn, assists in the removal of the core element CE from the free terminal end 12b of the mandrel 12 during axial translation to the filtration fiber production subsystem 100.

Figure 3:
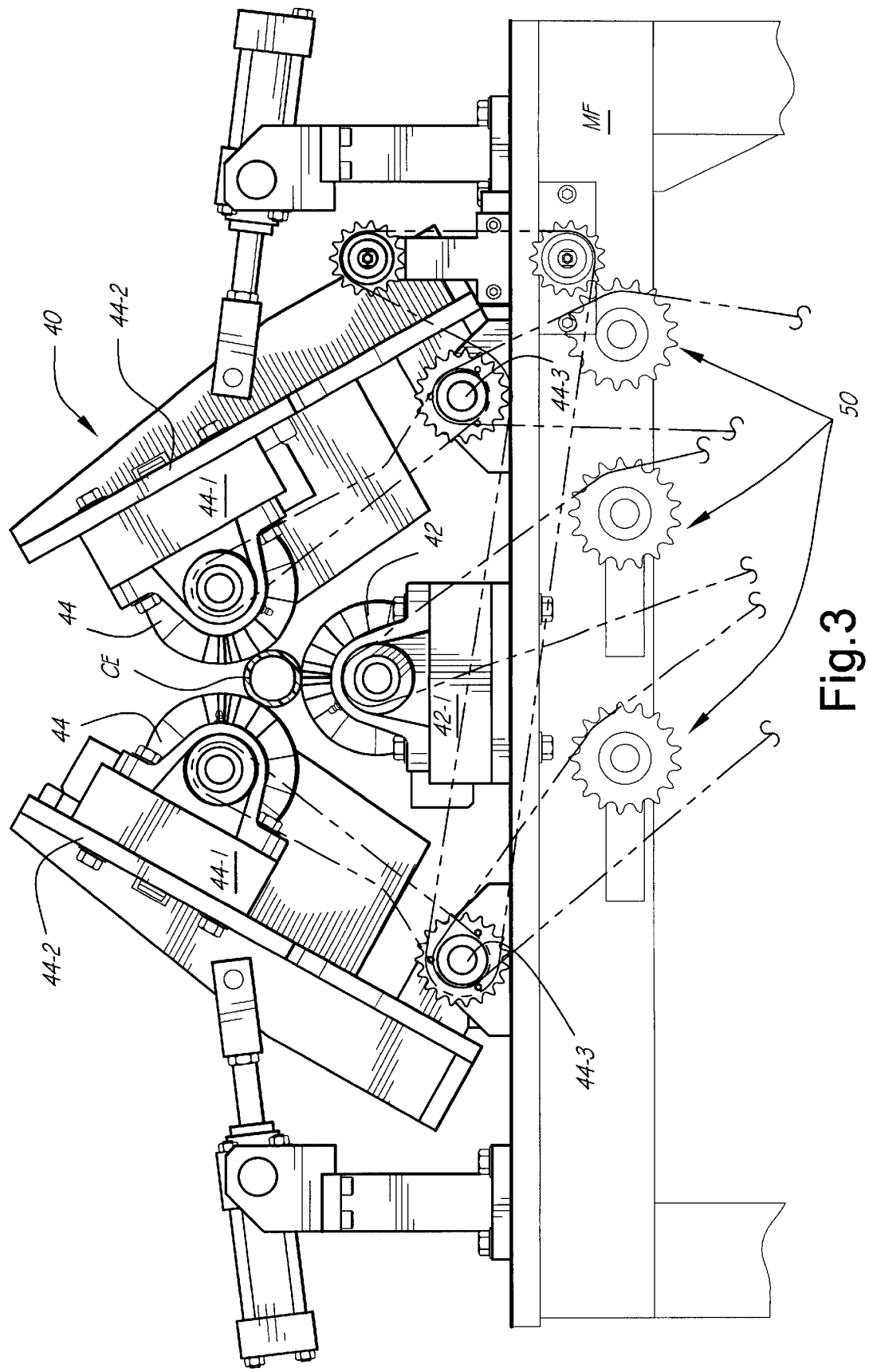
FIG. 3 is an enlarged cross-sectional elevational view of the melt-blowing subassembly shown in FIG. 2A as taken along line 3—3 therein.

A core element drive assembly 40 is positioned downstream of the melt-blowing die DC. As is perhaps more clearly shown in FIGS. 3 and 4, the drive assembly 40 includes a lower driven roller 42, and a pair of lateral driven rollers 44. The roller 42 and pair of rollers 44 are substantially equally spaced apart from one another about the periphery of the core element CE. The roller 42 is mounted for rotational movement by bearing block 42-1 which is rigidly fixed to a component part of the machine frame MF. The rollers 44, on the other hand, are each mounted for rotational movement by bearing blocks 44-1. These bearing blocks 44-1 are, in turn, rigidly fixed to mounting plates 44-2. The mounting plates 44-2 are themselves mounted for pivotal movements toward and away from the core element CE by axle 44-3. The mounting plates 44-2 are connected to the actuator arm 44-4 of cylinders 44-5. Thus, actuation of the cylinders 44-5 will cause the plates 44-2 to pivot about the respective axles 44-3 to move the rollers 44 toward or away from the core element CE.

The rollers 42 and 44 are driven by means of sprocket and chain assemblies 50 which, in turn, are connected operatively to a drive motor (not shown). The rotational axes of rollers 44 are canted slightly, but meaningfully, in such a way to urge the core element CE to translate axially in a downstream direction (i.e., upwardly out of the plane of FIG. 3). Thus, the in situ preformed core element CE is withdrawn continuously at a predetermined rate (i.e., determined by the cant angle and/or rate of rotation of the rollers 44) from the free terminal end 12b of the mandrel 12 and transferred to the downstream filtration fiber production sub-system 100. That is, downstream of the drive assembly 40, the core element CE serves as the forming mandrel and the sole means of support during the melt-blowing of the filtration fibers in the sub-system 100. A ball joint coupling 12c is provided between the terminal end 12b of the mandrel 12 and the remaining rigid upstream forming section 12d (i.e., that section of the mandrel 12 onto which the core element fibers are melt-blown in sub-system 10). The ball joint coupling 12c thus permits the terminal end 12b to move freely angularly about two axes perpendicular to the axis of the upstream forming section 12d. Such freedom of movement is typically quite important during system start-up in order to allow the initial (and typically incomplete) core element section formed during start-up to be maintained in contact with the rollers 42 and/or 44.

As shown in the photomicrographs of FIGS. 10A and 10B, the core element CE is comprised of a non-woven mass of melt-blown ribbon-like cords. That is, these ribbon-like cords are comprised of multiple smaller diameter, continuous length, melt-blown fibers that are coalesced substantially side-by-side to one another along at least lengthwise portions of their respective peripheral surfaces. Thus, by the term "cord" is meant that multiple individual, continuous length, melt-blown fibers are melt-bonded to one another at axially extended locations along the longitudinal extents of the fibers so that the individual fibers are substantially in side-by-side relationship and are inseparable one from another to form a ribbon shaped (e.g., substantially planar) multiple fiber structure. These cords in the core element CE are also thermally bonded one to another at their respective crossing points such that the core element CE is quite rigid, especially after cooling.

The nominal diameter of these ribbon-like cords (i.e., the nominal cross-sectional diameter of a circle which completely circumscribes or bounds the cross-sectional geometry of the cords) is between about 100 to about 1500 $\mu$m, and more preferably between about 200–900 $\mu$m. These non-woven cords will thus form a relatively open matrix which has a mean porosity (void volume) of greater than about 30%, and typically greater than about 50%. Specifically, the preferred mean porosity (void volume) of the core element CE in accordance with the present invention will be between about 30% to about 80%, and more preferably between about 50% to about 60%.

Due to the highly porous structure of the core element CE and the relatively large pore sizes resulting from the core element construction, it also essentially does not serve a filtration function. That is, by the term "filtration" is meant that a substantial increase in differential pressure ($\Delta P$) is observed after at least about 30 minutes of water flowing at 2.5 gallons per minute (gpm) and containing 200 parts per million (ppm) of a particulate contaminant where at least 50 vol. % of the particles have an average size of about 65 $\mu$m or greater is passed through the core wall of a core element having the dimensions of 1.07 inches inside diameter (ID)× 1.5 inches outside diameter (OD)×10 inches in length. Thus, substantially no "filtration" occurs when substantially no pressure differential is observed after 30 minutes of fluid flow through the core element wall in accordance with the conditions expressed immediately above. That is, substantially no increase in pressure differential is thereby indicative of minimal (if any) trapped particulates in the core element fiber matrix.

As noted above, the core element CE is transferred continuously downstream to the filter fiber production sub-system 100. Specifically, filtration fibers are melt-blown onto the continuously (and simultaneously) rotating and axially translating core element CE at the sub-system 100. Most preferably, the filter fiber production sub-system 100 is in accordance with U.S. Pat. No. 5,591,335 to Barboza et al (the entire content of which is expressly incorporated hereinto by reference). That is, several (e.g., three in the case of the embodiment depicted in the accompanying FIGURES) melt blowing filtration fiber dies DF1–DF3 are supplied with molten thermoplastic polymeric material from respective extruders FE1–FE3. At least one additional melt blowing die DF4 is supplied with a separate stream of molten thermoplastic polymer from its associated extruder FE4. The streams of filaments issued by the die DF4 are thus caused to impinge upon transfer roller 102 which transfers them into co-location with at least one of the fiber streams issued from dies DF1, DF2 and DF3. For example, in the embodiment shown, the fibers formed by die DF4 will be co-located substantially with the fibers formed by die DF2, it being realized of course that the location of the die DF4 could be moved to change such fiber placement.

Thus, the resulting filter cartridge preform (noted in phantom line in FIG. 2A by reference FCP) will most preferably include annular bands or zones of filtration fibers corresponding to the fiber characteristics of the fibers issued by dies DF1–DF3. In at least one of these annular bands or zones, additional fibers issued by die DF4 will be co-located with the filtration fibers. Most preferably, therefore, the filter cartridge preform FCP (and the filter cartridges severed therefrom as will be described in greater detail below) will exhibit depth filtration characteristics due to the differences between the fiber characteristics from one annular zone to another. Also, the support fibers could be co-located in a number of the filtration zones, if desired. However, it should be understood that the present invention is not limited to the production of depth filter cartridges. That is, a single annular layer of filtration fibers may be melt-blown onto the core element CE by a single melt blowing die. Suffice it to say here that numerous modifications and equivalent filter cartridge structures are capable of being designed by those skilled in the art using the apparatus and production techniques of the present invention.

Virtually any thermoplastic polymer which is capable of being melt blown may be used in accordance with the present invention. Such polymers, may, for example, be polyolefins (e.g., polymers and copolymers of polyethylene, polypropylene and the like), polyamides (e.g., nylon-6, nylon-6,6 and other nylons), polyesters (e.g., polyethylene terephthalate, polybutylene terephthalate, polycyclohexylene dimethylene terephthalate and the like), acetals, fluoropolymers (e.g., ethylene-chlorotrifluoro-ethylene), polyphenylene sulfide, biodegradable polymers (e.g., poly-(lactide)), liquid crystal polymers, polyetheretherketone (PEEK), polystyrenes, polymers of vinylidene monomers such as vinyl chloride, vinyl acetate, vinylidene chloride, and acrylonitrile), and mixtures thereof. Particularly preferred are the polyolefins, polyesters and nylons. These thermoplastic melt-blowable polymers may be "virgin" polymers, or may be, or contain meaningful amounts of recycled polymers.

Figure 2B:
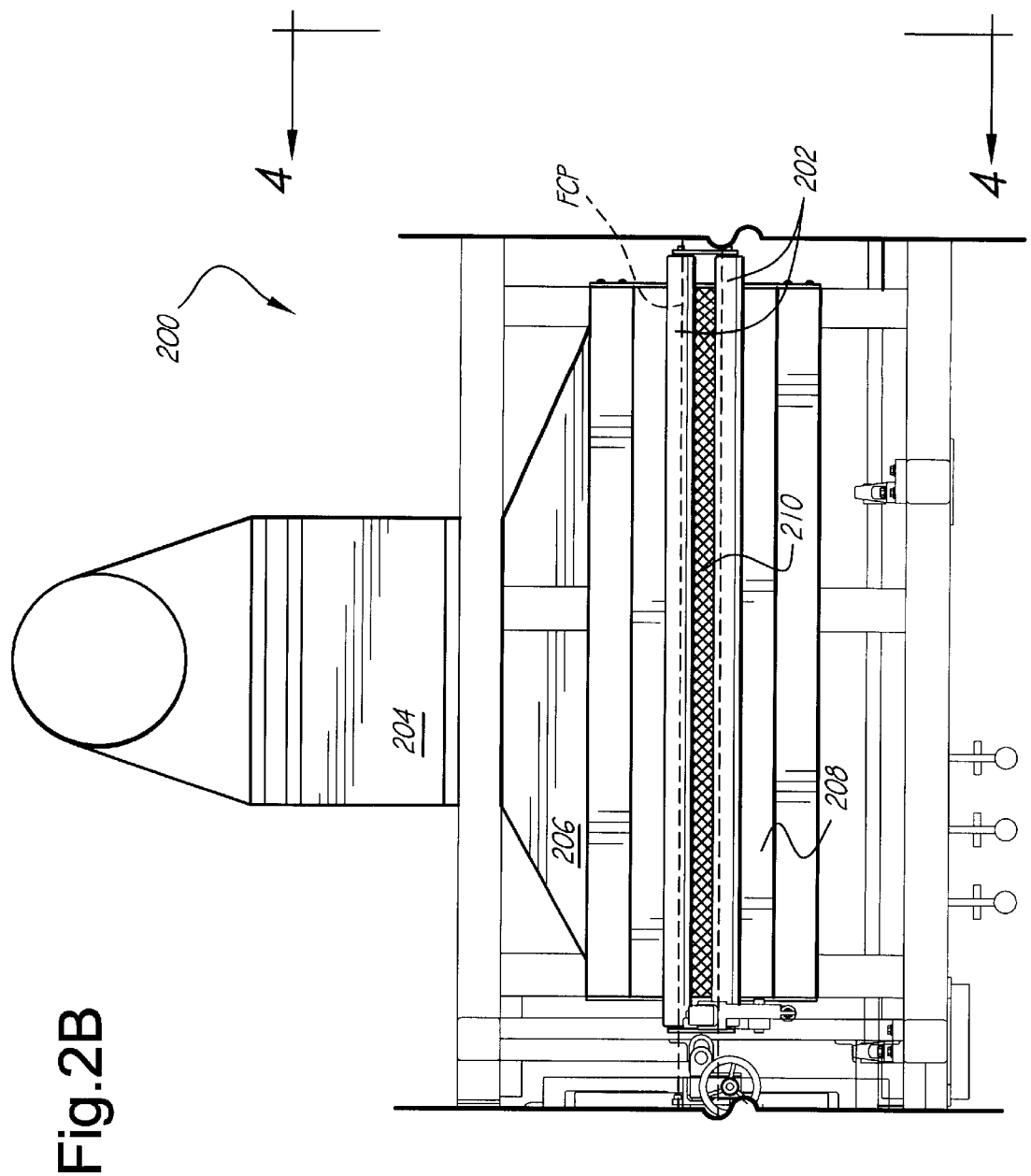
FIG. 2B is a somewhat enlarged plan view of the cooling subassembly in accordance with the present invention.

Subsequent to melt-blowing the filtration fibers at the filtration fiber production sub-system 100, the filter cartridge preform (referenced hereinafter as "FCP") axially translates continuously into and through the cooling sub-system 200 which is depicted in greater detail in accompanying FIGS. 2B and 5. As shown, the filter cartridge preform FCP is supported by a pair of laterally (i.e., relative to the axial movement of the preform FCP) spaced-apart, parallel support rollers 202. An air duct 204 supplies chilled air from a conventional air chiller (not shown) to the underside of the preform FCP via transition plenums 206, 208, respectively.

Figure 5:
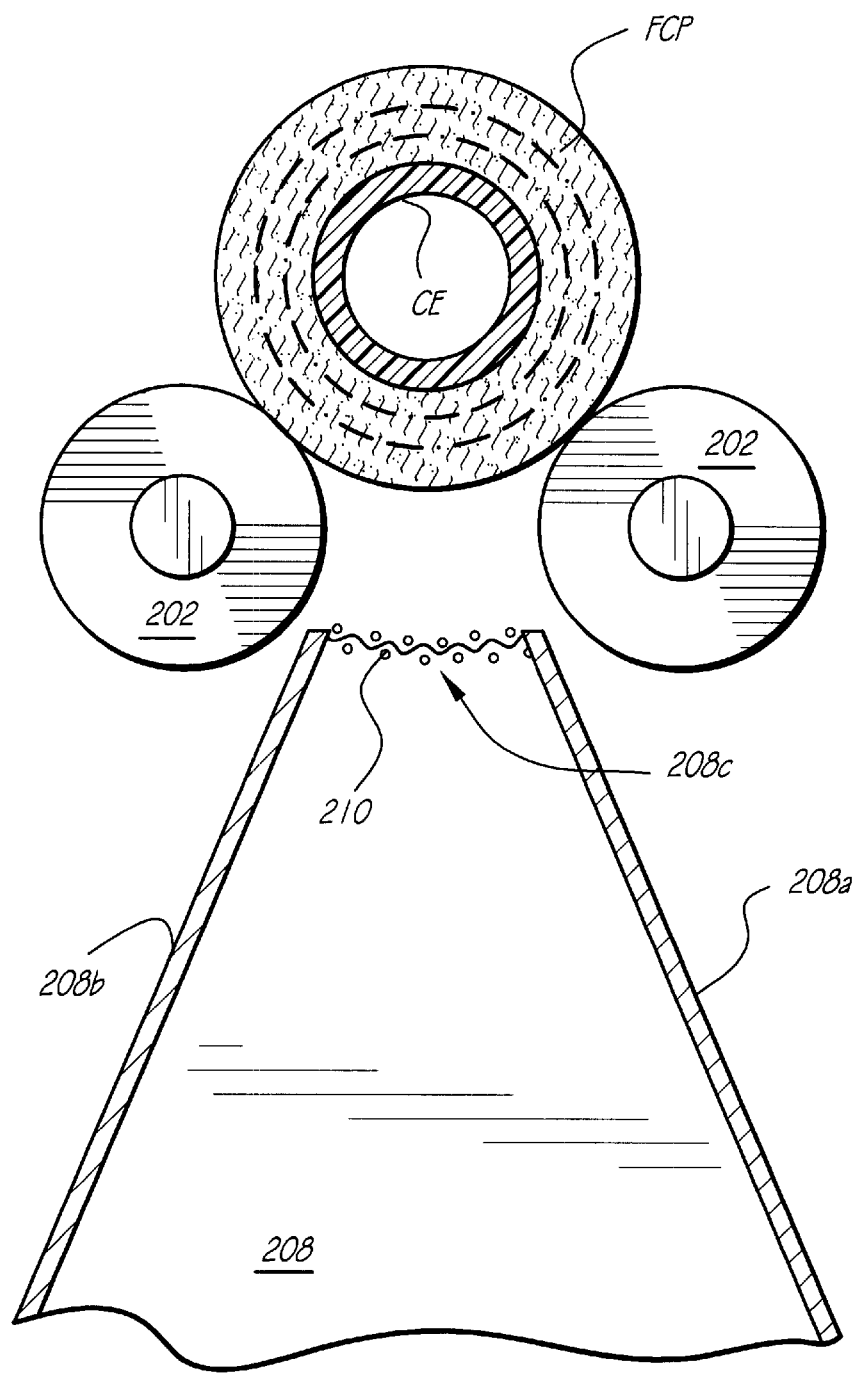
FIG. 5 is an enlarged end elevational view of the cooling subassembly depicted in FIG. 2B as taken along line 4—4 therein.

As is perhaps more clearly shown in accompanying FIG. 5, the plenum 208 includes opposed side walls 208*a*, 208*b* which converge upwardly and inwardly toward the preform FCP terminating at a discharge slot 208*c* oriented parallel to the preform's longitudinal axis. The discharge slot 208*c* is thus positioned subjacently to the preform FCP supported on the rollers 202. A screen member 210 is interposed between the discharge nozzle 208*c* and the preform FCP to prevent foreign matter from entering the plenum 208. As the preform continuously rotates and longitudinally translates along the support rollers 202, the chilled air will cause the fibers forming the preform FCP to cool substantially prior to further processing. As a result, once the preform FCP leaves the cooling sub-system 200, the preform FCP and the filter cartridges cut therefrom will only experience minimal dimensional shrinkage.

The preform FCP is continuously discharged axially from the cooling sub-system 200 into the cutting and transfer sub-system 300 which is shown in greater detail in accompanying FIGS. 2C and 2D. More specifically, the external periphery of the preform FCP is engaged by the drive assembly 302. Like the core element drive assembly 40 discussed previously, the preform drive assembly 302 includes a lower support roller 304 and a pair of rollers 306. These rollers 304 and 306 are spaced apart from one another about the periphery of the filter cartridge preform FCP. The rollers 306 are moveable towards and away from the preform FCP by means of cylinders 306-1 and their respective actuator arms 306-2. The rollers 304 and 306 are driven like the rollers 42 and 44 discussed previously so as to rotate the preform FCP in the same rotational direction and at the same rotational speed. Furthermore, the axes of the rollers 304 and 306 are canted slightly, but meaningfully, so that their respective rotation will urge the filter cartridge preform FCP to move continuously axially downstream at a substantially constant rate.

The preform FCP is supported downstream of the drive assembly 302 by a pair of laterally spaced-apart support rollers 308-1, 308-2, each of which is supported for rotational movement about its respectively longitudinal axis. A cutting assembly 310 is positioned near the upstream ends of the rollers 308-1, 308-2 so as to cut the preform FCP into predetermined lengths and thereby form filter cartridges therefrom. Specifically, the cutting assembly 310 includes a rotary saw 312 which is mounted to a carriage assembly 314 for reciprocal movements towards and away from the filter cartridge preform FCP. Thus, when advanced toward the preform FCP, the saw 312 will sever it along a plane transverse to the preform's longitudinal axis. The downstream section of the preform that has been severed from the upstream section thereof will thus become the filter cartridge FC (see FIGS. 7A–7D, for example) that may be further processed as desired (e.g., by mounting end caps thereto, dressing the ends thereof and/or packaging for distribution).

The saw 312 is driven at high speeds by motor 316. The saw 312, carriage assembly 314 and motor 316 are collectively mounted on platform 318 to allow the entire assembly to traverse axially parallel to the continuously axially translating preform FCP, the purpose for which will be discussed in greater detail below.

A rate sensor assembly 320 is provided downstream of the cutting assembly 310. In general, as will be described in greater detail below, the rate sensor assembly 320 senses the rate of axial downstream translation of the filter cartridge preform FCP which then enables the cutting assembly 310, and the saw 312 carried thereby, to be slaved to, and move at the same axial translation rate as, the preform FCP. In such a manner, therefore, filter cartridges of extremely accurate finished lengths may be made as compared to the use of a non-axially translatable cutting assembly.

The rate sensor assembly 320 includes a support frame 322 which is threadably coupled to a threaded control rod 324. Rotation of the control rod 324 in one or another rotation directions thereby causes the support frame 322 to be moved parallel to the longitudinal axis of the filter cartridge preform FCP between different upstream and downstream positions, respectively. A forward section 322-1 of the support frame 322 is also moveable independently along a guide rod 326. The forward section 322-1 carries a the sensor head 328 which is coaxially mounted relative to the filter cartridge preform FCP and projects in an upstream direction (i.e., rearwardly).

The terminal end of the filter cartridge preform FCP will thus, in time, come into contact with the sensor head 328 positioned at a nominal downstream location via the control rod 324 and support frame 322 so that continued axial translation of the preform FCP will thereafter drive the support frame section 322-1 in an axial downstream direction along the guide rod 326. The axial movement of the support frame section 322-1 is measured by suitable linear distance sensor 320-1 which transmits position and rate signals via cabling enclosed within flexible cable chase 330 to the programmable controller PC (see FIG. 1). These position and rate signals are then used by the controller PC to activate and coordinate movement of the cutting assembly 310 to ensure that accurate length filter cartridges are cut from the preform FCP.

Once the filter cartridge FC is severed from the preform FCP, it must be transferred out of the preform's path of continuous axial translation. To accomplish this function, the sub-system 300 is provided with a plurality of elongate transfer arms 340 disposed transversely below the axial path of the preform FCP. The roller 308-2 is mounted at each end to pivot arms 348 which allow the roller 308-2 to pivot between a supporting condition as shown in FIG. 2C wherein the pair of rollers 308-1, 308-2 collectively support the filter cartridge therebetween, and a non-supporting condition wherein the space between the rollers 308-1, and 308-2 is increased sufficiently to allow the filter cartridge to fall by gravity into the awaiting gripper fingers 340-1 (see FIG. 7A) of the transfer arms 340.

The filter cartridges FC severed from the preform FCP are then transferred to an end-finishing station 350 which is shown more clearly in accompanying FIG. 2D. Specifically, the transfer arms 340 carrying a filter cartridge FC from its pick-up position immediately below the rollers 308-1, 308-2 pivot about the support rod 342 (see FIGS. 6A–6D) through about 180° to a finish position wherein the filter cartridge FC is positioned between an axially opposed pair of ultrasonic welding horns 352, 354. The downstream ultrasonic welding horn 354 is mounted to a support frame 356 which is itself threadably coupled to a threaded control rod 358. The control rod 358 is capable of being rotated by a suitable stepping motor 360. Therefore, when the control rod 358 is rotated in one or another selected rotation directions, the ultrasonic welding horn 354 is caused to move axially closer to or farther away from the upstream horn 352. Control cabling may be routed to the components via flexible cable chase 362.

As shown more clearly in accompanying FIGS. 6A–6D, each of the transfer arms 340 is mounted to a support rod 342 oriented parallel to the filter cartridge preform for pivotal movements about the support rod's longitudinal axis. In addition, the spacing between the transfer arms 340 is controllably changed by the control rods 344, 346. Specifically, the downstream most one of the transfer arms 340 is threadably connected to the control rod 344, while the intermediate one of the transfer arms 340 is threadably connected to the control rod 346. The upstream most one of the transfer arms 340, however, is not threadably connected to the control rod 344, but instead remains in a stationary (set) position regardless of the movements of the intermediate and downstream ones of the transfer arms 340.

In order to achieve proportional spacing between the individual transfer arms 340, the number of thread turns per unit length of the control rod 346 is twice the number of thread turns of the control rod 344. In addition, the number of thread turns per unit length of the control rods 324, 344 and 358 is equivalent. Therefore, for each revolution of the threaded control rods 324, 344 and 358, their associated structures threadably connected thereto will translate axially along the rods by the same linear extent. However, rotation of the control rod 346 by the same number of revolutions per unit time as compared to that of the control rods 324, 344 and 358 will only cause the intermediate transfer arm 340 to be moved axially by a linear dimension that is only one-half that of the downstream arm 340 (as well as one-half the linear dimension of the sensor head 328 and ultrasonic welding horn 354). In such a manner, it will therefore be appreciated that the linear spacing between the transfer arms remains proportionally constant regardless of the lengthwise dimension of the filter cartridge FC that is cut from the preform FCP. The present invention is thus capable of accommodating virtually any length of filter cartridge FC that may be desired to be cut from the preform FCP.

Figure 6A:
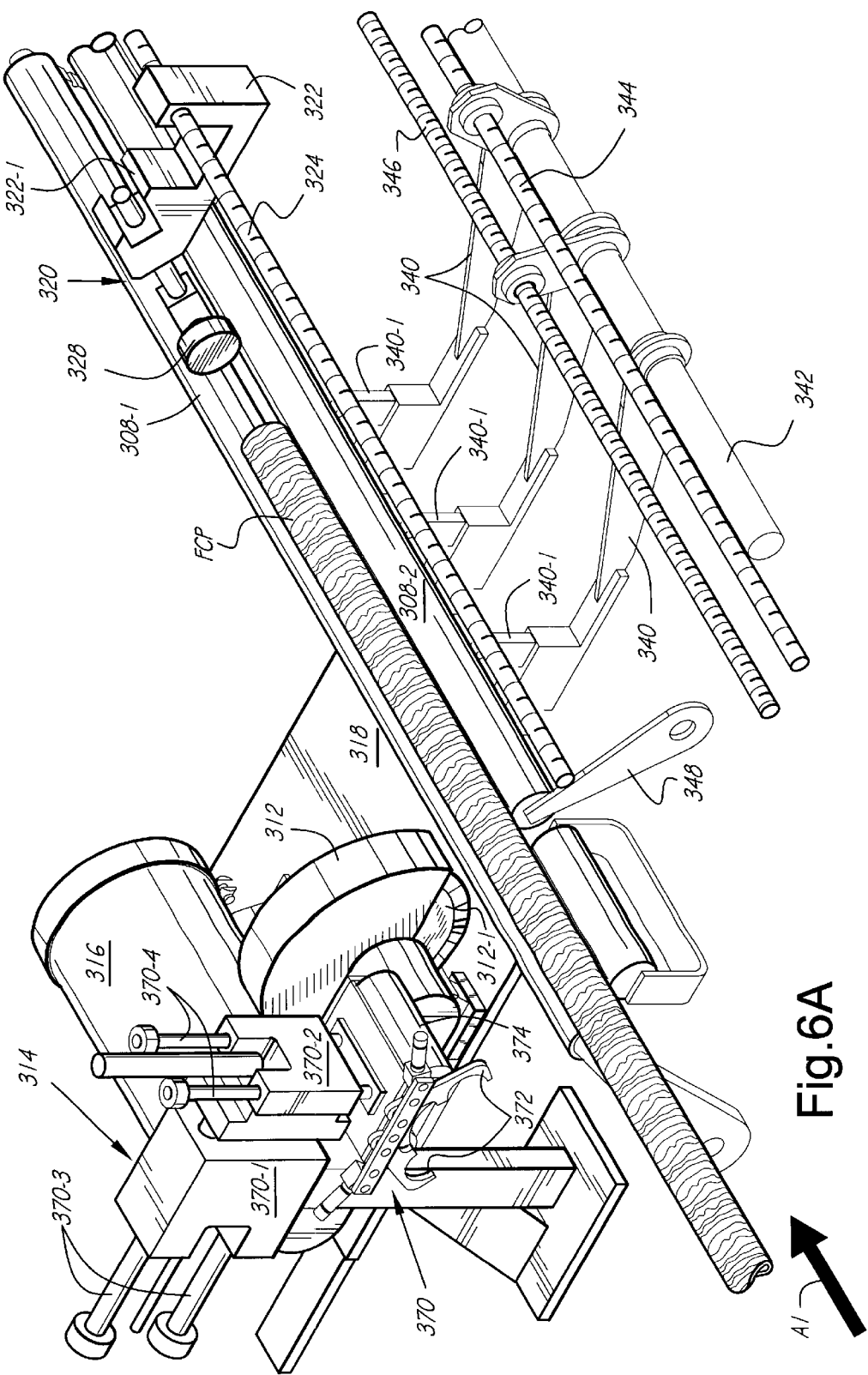

Accompanying FIGS. 6A–6D schematically depict an operational sequence employed by the structures discussed above to sever a filter cartridge FC having an extremely accurate longitudinal dimension from the filter cartridge preform FCP. Specifically, as shown in FIG. 6A, the filter cartridge preform FCP is continuously being translated in a downstream axial direction as noted by arrow A1 in the manner described previously. The downstream terminal end of the preform FCP thus continuously approaches the sensor head 328 poised in its ready position as shown.

Figure 6B:
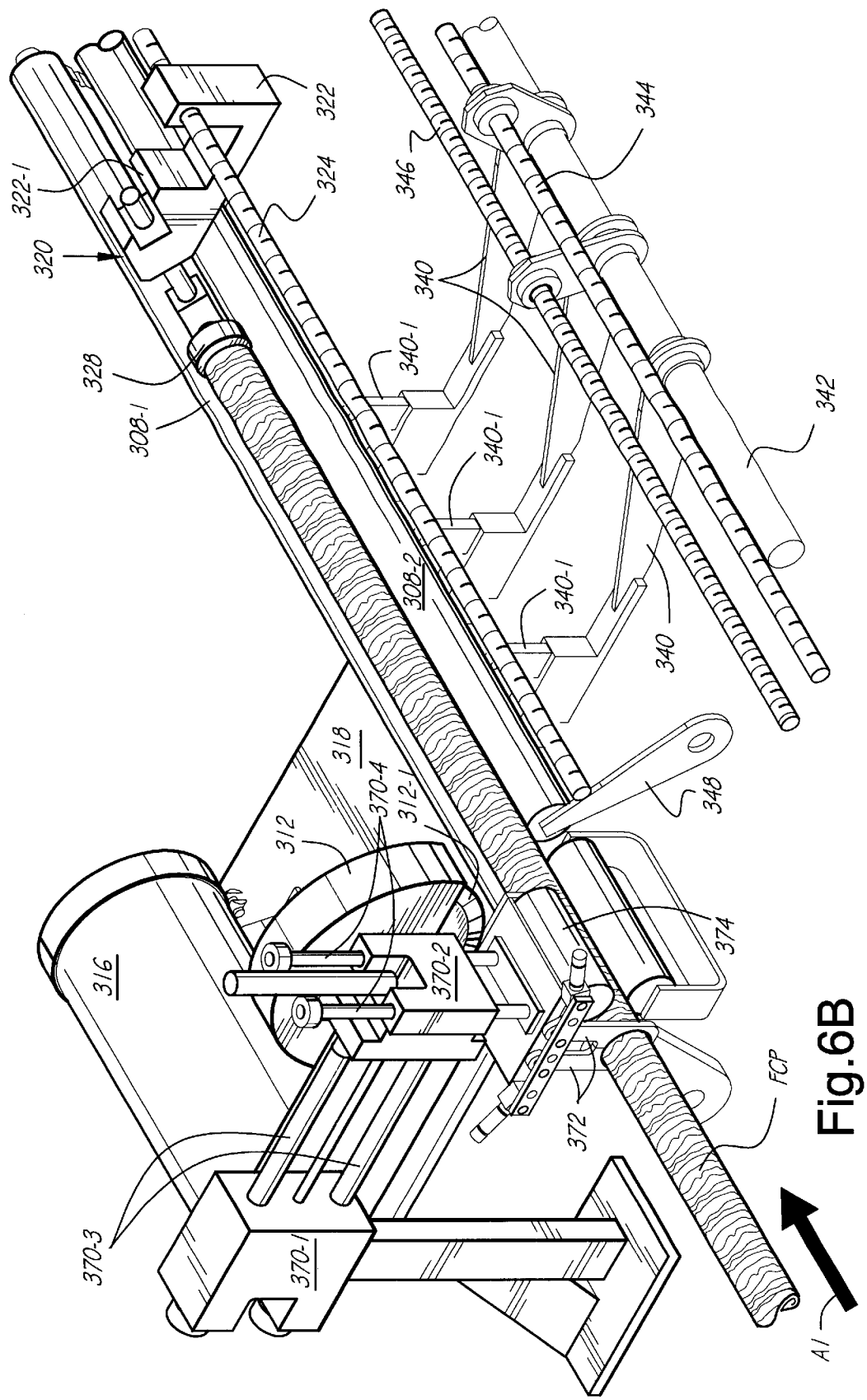
Figure 6D:
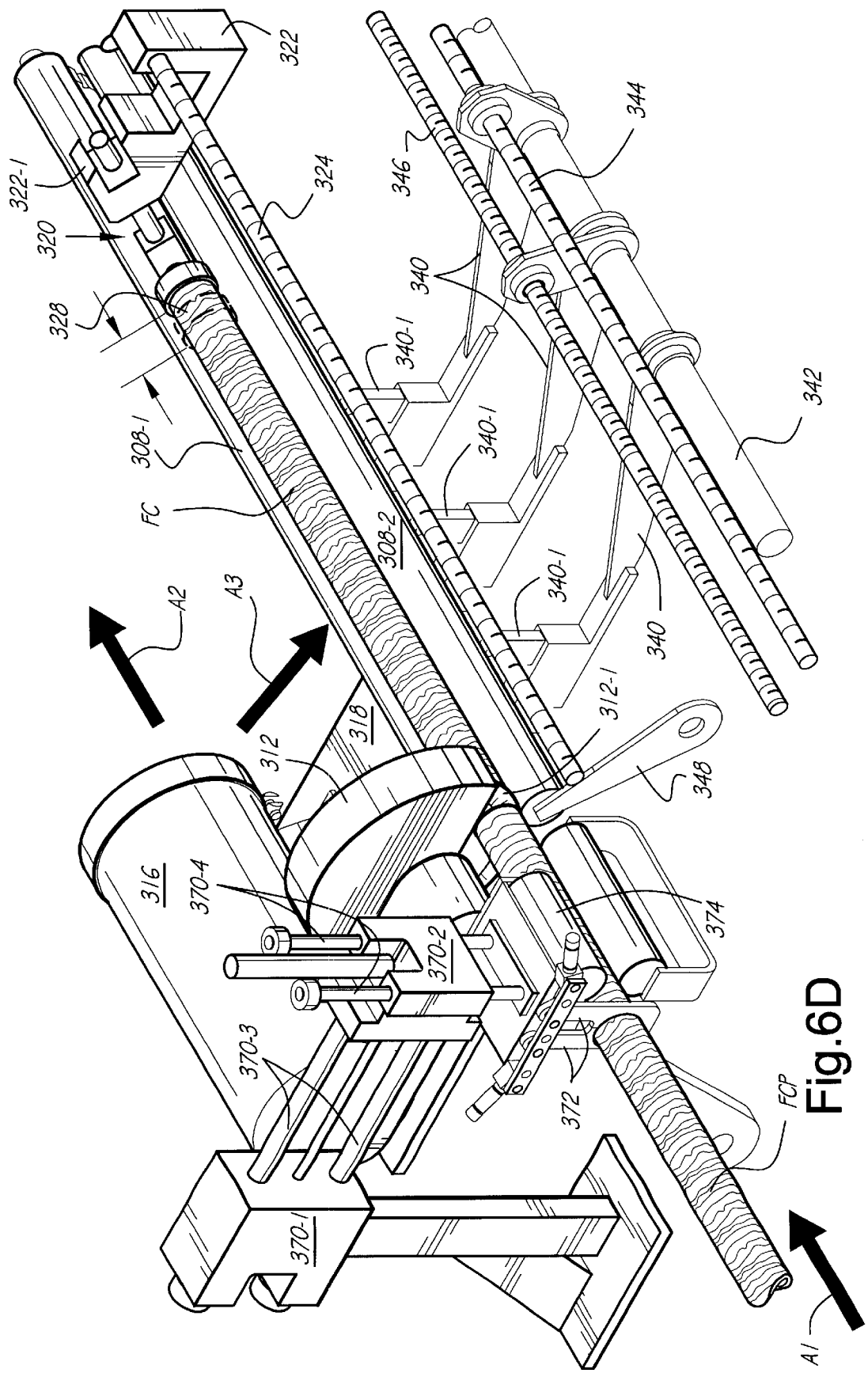

Substantially immediately upon the downstream terminal end of the preform FCP contacting the sensor head 328, the stabilizer assembly 370 will be caused to advance into engagement with an upstream section of the preform FCP. Specifically, as shown in FIG. 6B, the stabilizer fingers 372 and stabilizer rollers 374 of the stabilizer assembly 370 will be brought into engagement with the upstream section of the preform FCP by movement forwardly via the guide rods 370-3 and then downwardly via guide rods 370-4. Movement of the stabilizer assembly is most conveniently accomplished using electric precision motors 370-1 and 3-702 so as to control movement of the stabilizer fingers 372 relative to the preform FCP along the guide rods 370-3 and 370-4, respectively. The stabilizer assembly 370 prevents lateral displacement of the filter cartridge preform FCP during the cutting operation. That is, the contact between the rollers 374 and the fingers 372 with the preform FCP prevents the preform FCP from being pushed laterally out of its axial translation path by the cutting action of the saw blade 312-1, but still allow the preform FCP to rotate about its longitudinal axis. In other words, the fingers 372 provide a stabilization collar about the periphery of the preform FCP which do not restrict its rotational or axial motions.

Accompanying FIG. 6C depicts the state wherein the sensor head 328 has been displaced somewhat continuously in the downstream axial direction by the continuous advancement of the terminal end of the filter cartridge preform FCP as noted by the change in position between the sensor head's 328 position depicted in dashed and solid line. During this axial displacement, a signal is generated by the sensor head 328 by means of suitable distance-measuring sensor 320 (see FIG. 2C) operatively associated therewith which is supplied to the controller PC (see FIG. 1). The controller PC samples these distance measurements and thus generates a rate signal which is indicative of the rate of axial displacement of the continuously advancing preform FCP. Once this rate determination has been accomplished, the controller PC will then actuate the cutter assembly 310 to cause the carriage 318 to move parallel with the continuously advancing preform FCP at substantially the same linear advancement rate (arrow A2 in FIG. 6D). Simultaneously with such axial displacement, the controller will also activate the cutter assembly so that the saw 312 and its associated blade 312-1 will advance towards and cut through the preform FCP as shown by arrow A3 in FIG. 6D thereby severing a filter cartridge FC of desired length therefrom. This simultaneous axial displacement of the cutter assembly 310 will ensure that the saw blade 312-1 will reliably and accurately cut reproducible lengths of filter cartridges FC from the preform during each cutting cycle. Once the cutting operation is completed the structures are moved into their rest conditions as depicted in FIG. 6A to await another cutting cycle.

Figure 7B:
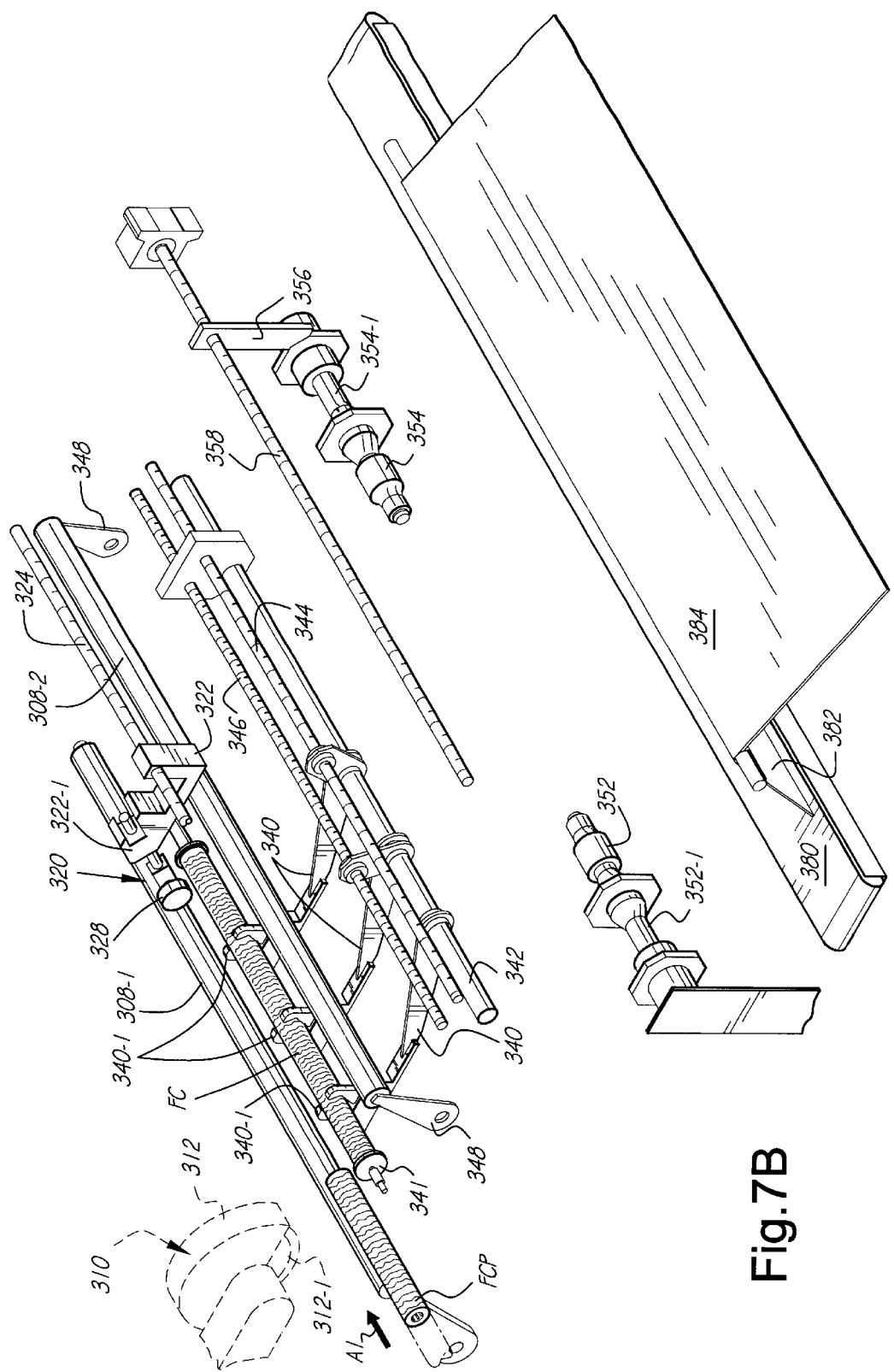

Severing of the filter cartridge FC from the preform FCP will activate a transfer cycle which will be described with reference to FIGS. 7A–7D. That is, the state of the structural components in FIG. 7A is immediately following the severing of a filter cartridge FC from the preform FCP as has been described. Thereafter, the support roller 308-2 is pivoted via the pivot arms 348 so that the fresh cut filter cartridge FC falls by gravity into the awaiting gripper fingers 340-1 of the transfer arms 340 as shown in FIG. 7B.

It will be observed that the gripper fingers 340-1 will move from an opened state as depicted in FIG. 7A to receive the filter cartridge FC and into a closed state as depicted in FIG. 7B so as to securely grip the filter cartridge FC. The filter cartridge FC is therefore allowed to drop initially into the opened gripper fingers 340-1 which then subsequently close to grip securely the filter cartridge FC to allow for its subsequent transfer. Prior to being gripped, the opposite ends of the filter cartridge FC are simultaneously pressed by positioning flanges 341 to ensure that the filter cartridge FC is reliably positioned accurately relative to the gripping fingers 340-1.

Figure 7C:
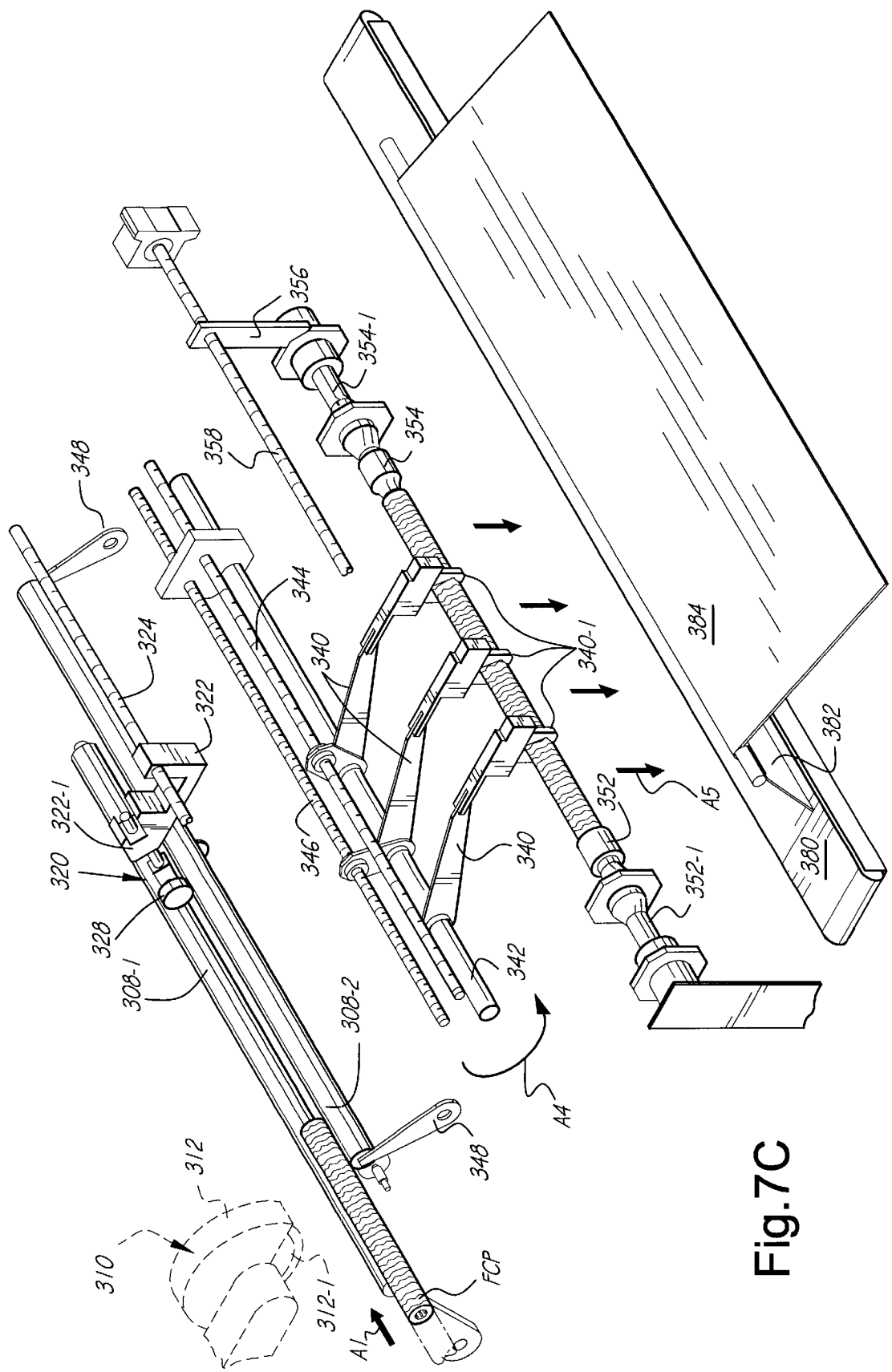

The transfer arms 340 then swing the gripped filter cartridge FC through about 180° (arrow A4 in FIG. 7C) to a position in axial alignment between the ultrasonic horns 352, 354 as shown in FIG. 7C. The horns are advanced into axial engagement with each end of the filter cartridge FC by electric or hydraulic actuators 352-1, 354-1, respectively, and are thereafter activated so as to provide a "dressed" end to the filter cartridge FC (e.g., to remove any debris and/or loose fibers that may be present subsequent to the cutting operation).

Figure 7D:
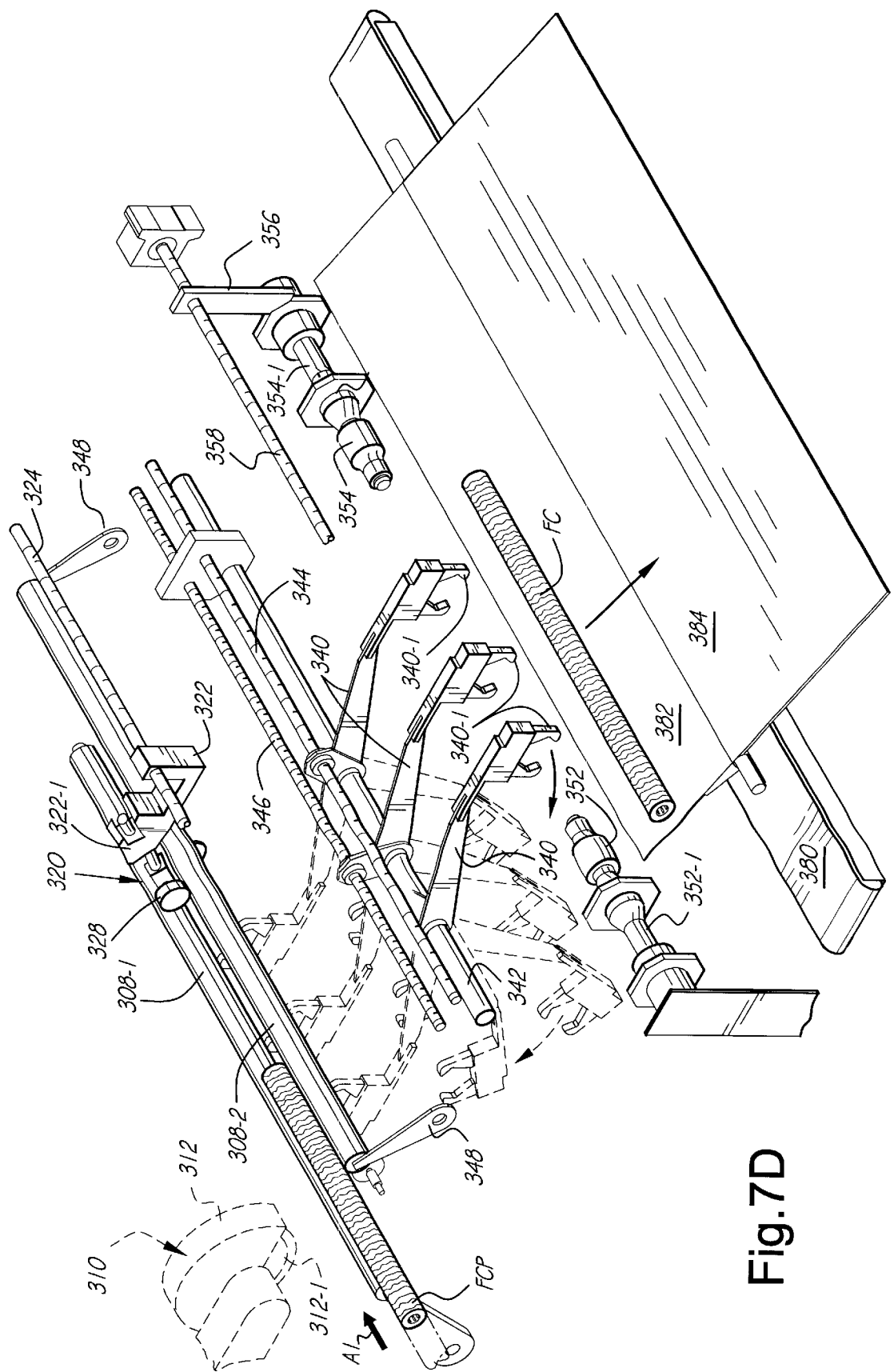

Once the ends of the filter cartridge have been "dressed" by the ultrasonic welding horns 352, 354, the actuators 352-1 and 354-1 retract each of the horns 352, 354, respectively, and the transfer fingers 340-1 are moved again into their opened state. This operation therefore allows the end-dressed filter cartridge FC to fall by gravity (arrows A5 in FIG. 7C) and be deposited onto a conveyor 380 which transfers the filter cartridge FC to a downstream finishing/packaging station FPS (see FIG. 1). Alternatively, as depicted in FIG. 7D, a deflector plate 382 may be raised by cylinders (not shown) so that the filter cartridge FC rolls by gravity onto the transfer plate 384 and ultimately is deposited into the filter collection bin FCB (see FIG. 1). Once the filter cartridge FC has been released, the transfer arms 340 are pivoted back to their initial rest position as depicted in FIG. 7A with the gripper fingers 340-1 thereof in an opened state.

Figure 8A:
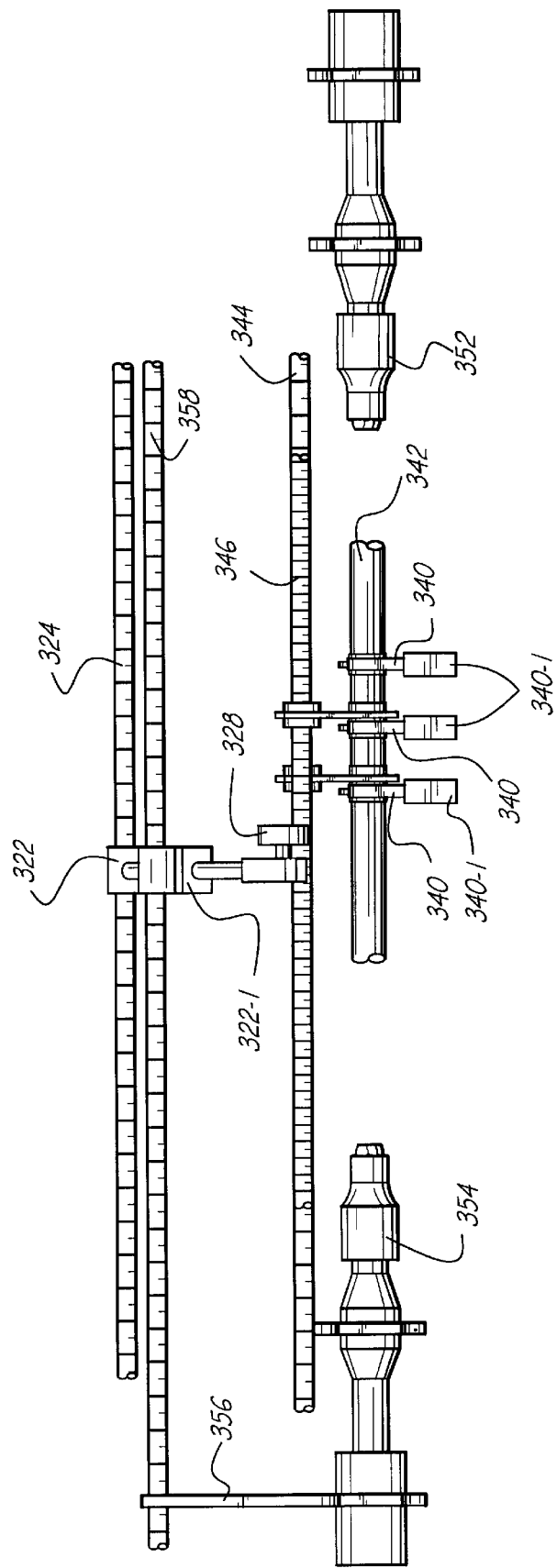

As was mentioned briefly above, the structural components in the cutting and transfer assembly 300 are capable of being moved longitudinally by a proportional linear extent so as to accommodate different lengths of filter cartridges that may be desired. The manner in which such components achieve that function is depicted schematically in accompanying FIGS. 8A–8C. In this regard, FIG. 8A shows an initial inoperative state whereby the sensor head 328, transfer arms 340 and ultrasonic horns 352, 354 are all in a ready condition. Activation of precision electric motors (not shown) connected to each of the control rods 324, 344, 346 and 358 will cause each to rotate the same number revolutions per time period. As such, since the number of thread turns per unit axial length for control rods 324, 344 and 358 is the same, the sensor head 328, downstream-most one of the transfer arms 340 and the ultrasonic horn 354 will move the same axial dimension parallel to their respective control rod (and to the elongate axial dimension of the filter cartridge preform FCP. However, since the control rod 346 has twice the number of turns per unit axial length as compared to the control rods 324, 344 and 358, the intermediate one of the transfer arms 340 will move simultaneously an axial dimension that is one-half that of the sensor head 328, downstream-most one of the transfer arms 340 and the ultrasonic horn 354. As a result, the sensor head 328, transfer arms 340 and ultrasonic head 354 are positioned proportionally so as to accommodate smaller-length and larger-length filter cartridges FC' and FC" as shown in FIGS. 8B and 8C, respectively.

In such a manner, therefore, the present invention is capable of producing various lengths of filter cartridges FC. This capability, coupled with the upstream capability of different and various filtration media means that numerous finished filter cartridge products having various filtration functions can be produced. Moreover, since the length of the filter cartridges can be changed without interruption of the upstream filter-media melt spinning operation, means that very small amounts of wastage ensues when it is desired to change from one filter cartridge product type to another.

In the event that the cutting assembly 310 is inoperative (e.g., as will occur when the saw blade 312-1 is changed/sharpened for maintenance purposes), an auxiliary cutting station 400 is provided at the downstream end of the filter cartridge preform conveyance path (see FIG. 1). The auxiliary cutting station 400 is shown in greater detail in accompanying FIG. 9. In general, during those times when the cutting assembly 310 is inoperative, it is important not to shut down the upstream processing stations 10, 100 and 200. In such situations, the sensor head 328 will be pivoted out of the path of the filter cartridge preform FCP which will therefore allow the filter cartridge preform FCP to be translated axially into the auxiliary cutting station 400.

The filter cartridge preform FCP is supported in the auxiliary cutting station 400 by a pair of support rollers 402, 404. A collar assembly 406 having an upper collar 406-1 and a lower, stationary, collar 406-2 is provided upstream of a cutting blade 408. The upper collar 406-1 is moveable towards and away from the lower collar 406-2, while the lower collar 406-2 (and hence the upper collar 406-1) is slidably mounted to guide rods 410 to allow the collar assembly 406 to be moved axially together with the filter cartridge preform. Contact rollers 412, 414 are provided with each of the upper and lower collars 406-1, 406-2, respectively, so as to allow the preform FCP to continue to rotate while gripped by the collar assembly 406.

In use, when the terminal end of the filter cartridge preform FCP advances beyond the cutting blade 408 as sensed by the position sensors 420, a control signal will be issued by the controller PC which causes the upper collar 406-1 to move toward the lower collar 406-2. The upper and lower collars 406-1, 406-2 thus rotatably grip the filter cartridge preform and are axially translated therewith during the cutting sequence. Since the cutting blade 408 is connected to the collar assembly 406, it will likely translate in an axial direction. Once the filter cartridge preform FCP is gripped by the upper and lower collars 406-1, 406-2, the controller PC will issue a command signal to an air cylinder (not shown) connected operatively to the cutting blade 408 causing it to be raised into contact with the filter cartridge preform. This upward movement of the cutting blade 408 and rotational movement of the filter cartridge preform FCP will cause the former to physically cut through the latter thereby severing a downstream portion of the filter cartridge preform FCP from the remaining upstream portion thereof. The severed downstream portion of the filter cartridge preform FCP may then fall by gravity to an awaiting collection bin or the like.

The downstream one of the positions sensors will sense that the severed downstream portion of the filter cartridge preform FCP is no longer present in the path of the remaining upstream portion. As a result, the controller PC will issue signals to reset the positions of the collar assembly 406 and the cutting blade 408 in preparation for the next cycle. This process may repeat itself as needed until the primary cutting assembly 310 is placed back into service, in which case, the normal cutting procedures as described previously to obtain the filter cartridge FC is practiced. A transparent shroud assembly 422 may be provided to enclose the collar assembly and cutting blade 408 during operation for operator safety purposes.

The present invention will be further understood by reference to the following non-limiting Example.

EXAMPLE

A melt-blown core element was fabricated using a conventional 6-inch wide melt-blowing die containing eighty-eight (88), 0.015 inch diameter polymer-extrusion orifices and an air gap setting of 0.075 inch. The die was positioned a distance of 8.5 inches from the core element forming mandrel. The air knives were positioned within the die assembly such that the die tip extended beyond the face of the die by 0.01 inch. The polymer used was a polypropylene homopolymer material having a melt flow rate, as supplied, of 38, g/10 min. and a density of 0.904 $g/cm^3$ (Amoco Chemical Company, Grade 7956). Molten polymer at a temperature of 425° F. was supplied to the die by a conventional extruder and metering pump at a flow rate of 155 g/min. Heated compressed air was also supplied to the die at a pressure of 1.8 psi and a temperature of 390° F. to attenuate the fibers and convey them to the mandrel. The mandrel was driven at a rotational speed of 172 rpm which, in conjunction with the cant angle and speed (172 rpm) of the core element drive rollers, provided a core element axial translation rate of 37.5 inches per minute.

The dimensions of the resulting core were 1.07 inches inside diameter×1.38 inches outside diameter and a weight of 4.1 grams per inch length. Photographs taken at magnifications of 20× and 35× of the core element fabricated by this Example appear as FIGS. 10A and 10B, respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A melt-blown tubular core element for supporting an annular filtration zone of a fluid filter cartridge, said core element comprised of a tubular mass of non-woven, continuous length, randomly intermingled thermoplastic cords forming an open, non-filtering matrix, wherein said cords are substantially planar ribbon-shaped multiple fiber structures which include multiple melt-blown continuous length thermoplastic fibers coalesced substantially side-by-side to one another along at least lengthwise axially extended portions of their respective peripheral surfaces, and wherein said cords are thermally bonded one to another at respective crossing points sufficient to impart axial and radial rigidity to the core element.

2. The core element of claim 1, wherein the cords have a nominal cross-sectional diameter of between about 100 to about 1500 $\mu$m.

3. The core element of claim 2, wherein the cords have a nominal cross-sectional diameter of between about 200 to about 900 $\mu$m.

4. The core element of claim 1, wherein the matrix of non-woven cords has a mean porosity of greater than about 30%.

5. The core element of claim 4, wherein the matrix of non-woven cords has a mean porosity of greater than about 50%.

6. The core element of claim 1, wherein the matrix of non-woven cords has a mean porosity of between about 30% to about 80%.

7. The core element of claim 6, wherein the matrix of non-woven cords has a mean porosity of between about 50% to about 60%.

8. The core element of claim 1, wherein the non-woven cords are thermally bonded to one another at respective crossing locations.

9. The core element of claim 1, wherein the thermoplastic fibers are formed of a thermoplastic polymer selected from the group consisting of polyolefins, polyamides, polyesters, acetals, fluoropolymers, polyphenylene sulfides, biodegradable polymers, liquid crystal polymers, polyetherether ketones, polystyrenes, polymers of vinylidene monomers and mixtures thereof.

10. A filter cartridge comprising:

a melt-blown tubular core element, and at least one annular filtration zone which includes a filtration medium surrounding said core element, wherein said core element is a tubular mass of non-woven, continuous length, thermoplastic cords forming an open, non-filtering matrix, and wherein said cords are substantially planar ribbon-shaped multiple fiber structures which include multiple melt-blown, continuous length, randomly intermingled, thermoplastic fibers coalesced substantially side-by-side to one another along at least lengthwise axially extended portions of their respective peripheral surfaces, and wherein said cords are thermally bonded one to another at respective crossing points sufficient to impart axial and radial rigidity to the core element to support the at least one annular filtration zone during filtration.

11. The filter cartridge of claim 10, wherein said filtration medium includes a mass of non-woven, continuous length thermoplastic filtration fibers.

12. The filter cartridge of claim 10 or 11, wherein the cords have a nominal cross-sectional diameter of between about 100 to about 1500 $\mu$m.

13. The filter cartridge of claim 10 or 11, wherein the cords have a nominal cross-sectional diameter of between about 200 to about 900 $\mu$m.

14. The core element of claim 10 or 11, wherein the matrix of non-woven cords has a mean porosity of greater than about 30%.

15. The filter cartridge of claim 10 or 11, wherein the matrix of non-woven cords has a mean porosity of greater than about 50%.

16. The filter cartridge of claim 10 or 11, wherein the matrix of non-woven cords has a mean porosity of between about 30% to about 80%.

17. The filter cartridge of claim 10 or 11, wherein the matrix of non-woven cords has a mean porosity of between about 50% to about 60%.

18. The filter cartridge of claim 10 or 11, wherein the non-woven cords arethermally bonded to one another at respective crossing locations.

19. The filter cartridge of claim 10 or 11, wherein the thermoplastic fibers are formed of a thermoplastic polymer selected from the group consisting of polyolefins, polyamides, polyesters, acetals, fluoropolymers, polyphenylene sulfides, biodegradable polymers, liquid crystal polymers, polyetherether ketones, polystyrenes, polymers of vinylidene monomers and mixtures thereof.

* * * * *